(12) United States Patent
Shukhmin et al.

(10) Patent No.: US 7,455,073 B2
(45) Date of Patent: Nov. 25, 2008

(54) VARIABLE FLOW VALVE

(75) Inventors: Konstantin Shukhmin, Tauranga (NZ); Rana Waitai, Papamoa (NZ); Andrew Palmer, Tauranga (NZ)

(73) Assignee: Robertshaw Controls Company, Richmond, VA (US)

( * ) Notice: Subject to any disclaimer, the term of this patent is extended or adjusted under 35 U.S.C. 154(b) by 0 days.

(21) Appl. No.: 11/507,107

(22) Filed: Aug. 21, 2006

(65) Prior Publication Data

US 2006/0278285 A1 Dec. 14, 2006

Related U.S. Application Data

(63) Continuation of application No. PCT/NZ2005/000135, filed on Jun. 21, 2005.

(30) Foreign Application Priority Data

Jun. 21, 2004 (NZ) .................... 533669
Oct. 19, 2004 (NZ) .................... 536055

(51) Int. Cl.
*F16K 11/065* (2006.01)

(52) U.S. Cl. .............. 137/625.34; 251/129.09

(58) Field of Classification Search ........... 137/625.28, 137/625.3, 625.34, 625.39, 601.14, 625.33, 137/625.38; 251/205, 210, 129.09
See application file for complete search history.

(56) References Cited

U.S. PATENT DOCUMENTS 1,486,685 A * 3/1924 Reinhardt .............. 137/625.33
1,882,392 A * 10/1932 Musgrave .................... 137/630
2,910,089 A 10/1959 Yarber
3,170,483 A * 2/1965 Milroy ........................ 137/553
3,853,146 A * 12/1974 Blair ......................... 137/625.3
4,108,210 A * 8/1978 Luthe et al. .................... 138/42
4,342,443 A * 8/1982 Wakeman ............... 251/129.08
4,624,282 A * 11/1986 Fargo ..................... 137/599.16
4,742,989 A * 5/1988 Akagi ..................... 251/129.05
4,909,277 A 3/1990 Vandiver
5,509,439 A 4/1996 Tantardini
5,727,591 A 3/1998 Doll
5,921,528 A * 7/1999 McCray ...................... 251/208

FOREIGN PATENT DOCUMENTS

| EP | 0 412 212 A1 | 2/1991 |
| EP | 1 158 230 A2 | 11/2001 |
| EP | 0 766 030 B1 | 12/2001 |
| EP | 1 277 996 A2 | 1/2003 |
| GB | 2 277 573 A | 11/1994 |
| GB | 2 325 725 A | 12/1998 |
| WO | WO 94/19612 | 9/1994 |
| WO | WO 96/08656 | 3/1996 |

* cited by examiner

*Primary Examiner*—Stephen M Hepperle
(74) *Attorney, Agent, or Firm*—Reinhart Boerner Van Deuren P.C.

(57) ABSTRACT

A fluid valve has a housing having an inlet port and an outlet port. A fluid flow path extends between the inlet port and the outlet port. A valve member is located in the housing in the fluid flow path. The valve member is moveable among a series of positions. The valve member and the housing have a plurality of apertures arranged such that a varied selection of the apertures is in the fluid flow path according to the indexed position of the valve member. In at least one indexed position of the valve member no apertures are in the flow path.

18 Claims, 26 Drawing Sheets

VARIABLE FLOW VALVE

CROSS-REFERENCE TO RELATED PATENT APPLICATIONS

This application is continuation of PCT/NZ2005/000135, filed Jun. 21, 2005, designating the United States of America, and claiming the benefit of New Zealand Application No. 536055 filed Oct. 19, 2004, and New Zealand Application No. 533669 filed Jun. 21, 2004, the teachings and disclosure of which are hereby incorporated in their entireties by reference thereto.

FIELD OF THE INVENTION

This invention relates generally to variable flow valves for fluids, and more particularly to electrically controlled variable flow valves for fluids.

BACKGROUND

There is a long-standing need for valve devices which can be used to produce a variable flow. Varying the flow through valves is usually achieved by varying the available cross-sectional area presented to the flow. Devices utilizing magnetic elements attached to a valve stem, which co-operate with electromagnetic coils in order to accurately align a valve element and thus control the rate of flow through a valve are well-known in the art. A typical example of this type of valve is disclosed in U.S. Pat. No. 5,509,439, where the power to a single electromagnetic coil is varied, causing a magnetic element to push against a spring. The force the element exerts increases or decreases with changes in the power to the coil and this changes the cross-sectional area of the flow path.

An example of a similar device is disclosed in U.S. Pat. No. 2,910,089. The power to a coil is altered in order to alter the position of a magnetic element, with a secondary coil used to hold or lock the valve in the desired position.

A difficulty with these devices resides in the difficulty of accurately controlling the position of the magnetic element, and achieving a graduated flow variation profile, particularly at the low flow rate end of the control.

SUMMARY OF THE INVENTION

It is an object of the present invention to provide a variable flow valve that goes some way towards overcoming the above disadvantages or which will at least provide the public with a useful choice.

Accordingly the present invention provides a fluid metering valve including a housing having an inlet port and an outlet port. A fluid flow path exists between the inlet port and the outlet port, and a valve member is located in the housing in the fluid flow path. The valve member moves among a series of indexed positions. The valve member and the housing have a plurality of apertures arranged such that a varied selection of the apertures is in the fluid flow path according to the indexed position of the valve member, with no apertures in the flow path in at least one indexed position of and valve member.

These and other advantages and features of the present invention will be apparent from the detailed description and the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

The present invention is applicable generally to the control of fluid flow including, by way of example only, gas cooking appliances such as cook-tops, barbecues and ovens, digitally controlled fluid flow for home and industrial appliances (washing machines, dishwashers, fire places, air and water heating, air conditioning) and transport vehicle fuel systems, water supply, for dosing and mixing fluids, etc.

Figure 1:
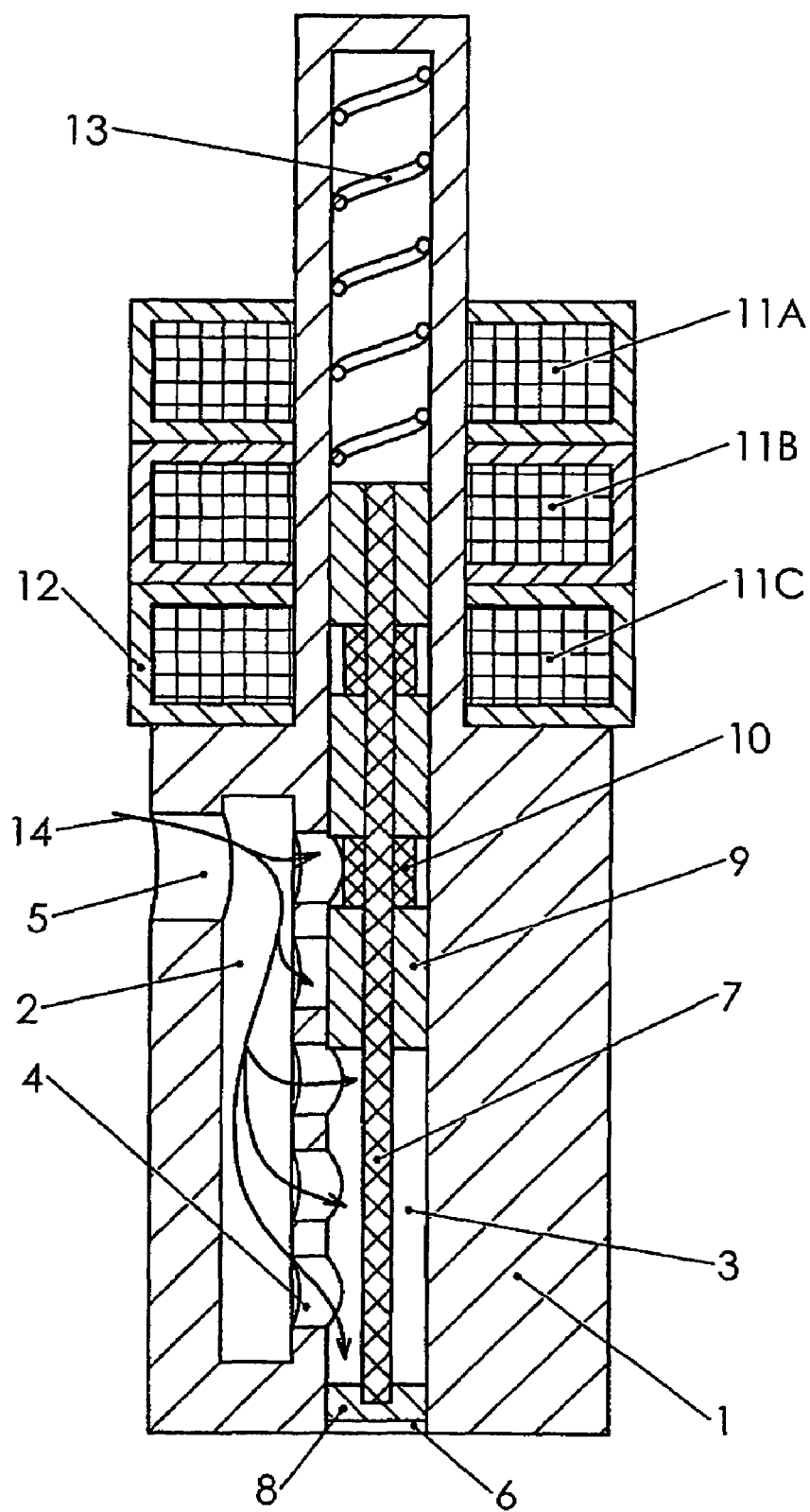
FIG. 1 shows a cross-sectional view of a valve of the present invention in the fully closed position.

In a first embodiment illustrated in FIG. 1, a variable flow valve includes a linear stepper motor. In the preferred embodiment the variable valve includes a housing 1, closed at one end and open at the other, the open end forming an outlet 6. It should be noted that the valve can be used in any orientation. However, for the purposes of this description, the closed end will be described as at the top of the valve, with the open end at the bottom of the valve housing 1. Outlet 6 is the outlet point for gases or other fluids flowing through the valve, and can be fitted with any suitable attachment means or connector. Towards the closed end, the housing 1 is surrounded by at least two and preferably three magnetic field generators 11A, 11B, 11C arranged linearly along part of the length of the housing 1. Preferably the magnetic field generators each surround the housing, with each coil 11 equally spaced from its neighbours. Each coil 11 is preferably surrounded by a core 12 preferably built from iron laminations, communally referred to as a cage. Each coil may have leads (not shown) that are connected to a power supply. Each of coils 11A, 11B, and 11C can be individually energised by the power supply under control of a controller according to a switching sequence. Preferred sequences control will be described later.

Towards the other end of the housing 1, inlets 4 pass from an outer part of the housing 1 to the inside surface of a bore. The inlets 4 are axially spaced along at least part of the length of the housing 1. In the preferred embodiment, there are five inlets 4A-E, each spaced at equal distances from its neighbours.

If differing flow profiles are required, the profiles can be generated by having differing cross sectional areas of the inlets.

The lower part of the housing 1 is surrounded by a sleeve portion 16. The sleeve fits flush with the outside surface of the housing 1, except where the inlets 4 pass into and out of the housing 1. There the sleeve is spaced slightly away from the external surface of the housing 1 to form a chamber 2. The chamber is sealed, apart from the inlets 4 and a primary inlet 5. The primary or master inlet 5 serves as the main entry point for gases or other fluid entering the valve. The inlet 5 may be fitted with any suitable attachment or connector, for connecting the inlet 5 to a gas or fluid reservoir.

Within the housing 1 there is a valve member or piston. The valve member includes a plunger 8 attached to the end of a valve stem 7. The plunger 8 lies towards the open end of housing 1.

Plunger 8 can be made from any suitable material or combination of materials which allow the edge or edge surfaces of plunger 8 to lie flush with or close to the inside surface of housing 1 and form a substantial seal between the periphery of plunger 8 and housing 1. The plunger may also incorporate a sealing means such as rubber o-ring 23 shown in FIG. 5.

At the other end of valve stem 7 are at least two magnetic elements 9. These elements be made from any magnetic material.

In this embodiment, the number of magnetic elements corresponds to the number of coils 11. Each of the three magnetic elements 9A, 9B, 9C shown in these embodiments are separated from each other by a non-magnetic insert 10 added to the stem 7 between the magnetic elements 9. These are equally spaced where three or more magnetic elements 9 are used.

The spacing of the magnetic elements corresponds to the spacing of the coils 11 along the outside of the housing 1 so that when one of the magnetic element segments is entirely within the coils, one of the neighboring segments will be approximately halfway between the coils, as shown for example in any of FIG. 3B, 3C, 3D, 3E, 3F, 3G or 3H. When a magnetic element is partially, but not entirely within a coil as arranged in this embodiment the energisation of the coil will create a significant attractive force pulling the magnetic element toward its centre. For a drive motor where the linear of movement is equal to the axial coil spacing, the coil to magnetic element spacing ratio is determined by the formula 8.

This staggered spacing allows the opening and closing drive sequence of the valve motor to be similar to that of a linear stepper motor.

The length of the magnetic elements 9 also correspond approximately with the length of the coils 11. Therefore each of the coils 11 and segments 9 are approximately the same length.

A spring 13 is located between the closed end of the housing 1 and the end of the valve stem 7. The spring 13, housing 1, and valve stem 7 are all dimensioned relative to one another such that in the neutral position (that is, with power to all of the coils turned off) the plunger 8 will block and seal the outlet 6. Spring 13 is a preferred option for urging the valve member toward the seal, but any suitable biasing agent would be used, including gravity.

Figure 2:
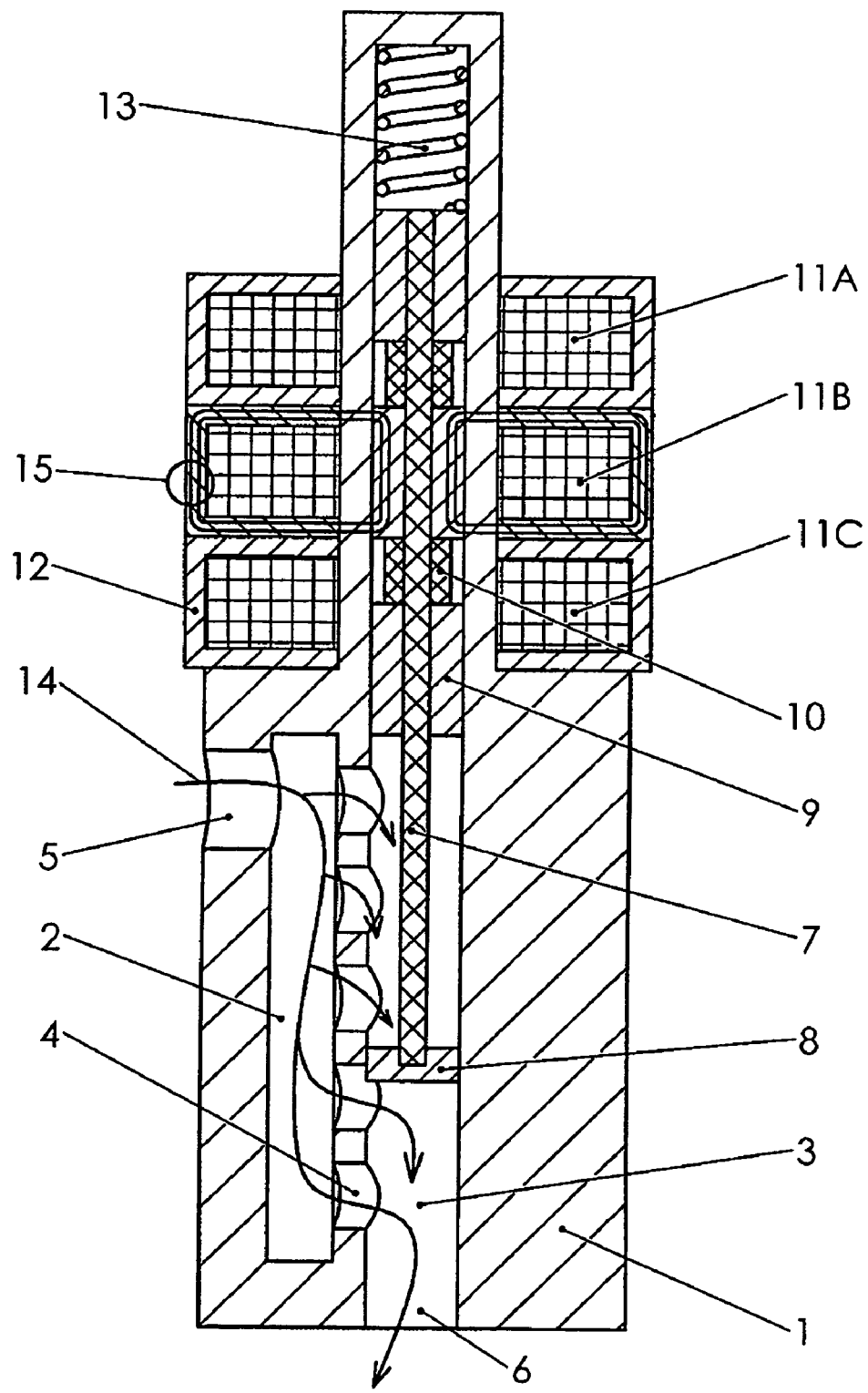
FIG. 2 shows a cross-sectional view of the valve of the FIG. 1 with the valve stem partially raised within the housing of the valve.
Figure 3:
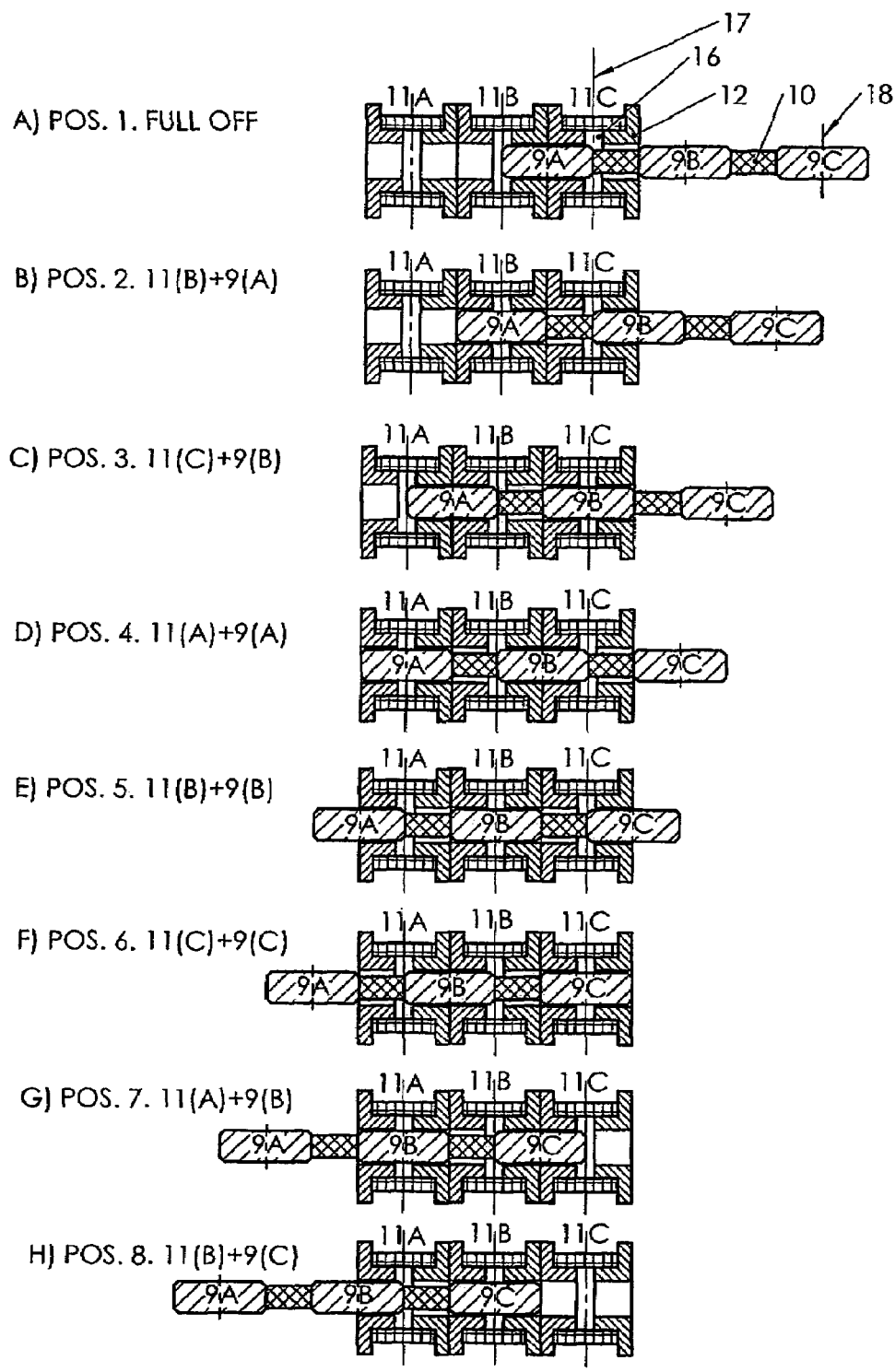
FIGS. 3A-H show a cross-sectional view of the coil activation sequence of the valve of FIG. 1, to open the valve from a fully closed position to fully open.

The operation of the variable flow valve will now be described in more detail with reference to FIGS. 1 through 3. Gas or other fluid flows into chamber 2 through master inlet 5, as shown by arrows 14. As previously described, in the "neutral" or power off position, plunger 8 blocks outlet 6 the valve member is urged to this position by spring 13. The valve member is urged to this position by spring 13. FIG. 3A shows the off position where magnetic element 9A is located so that it lies approximately halfway between coil 11B and 11C. Magnetic element 9B is located just outside coil 11C. The coil 11C can exert no significant force on the element 9B at this location.

When the valve is to be opened, coil 11B is activated first in the sequence. Activation of coil 11B draws magnetic element 9A up the housing 1, towards the closed end, so that magnetic element 9A lies substantially within the coil 11B when the magnetic centre 18 of the magnetic element 9A coincides with magnetic centre 17 of coil 11B as shown in FIG. 3B. As magnetic element 9A is drawn into coils 11B valve stem 7 and thus plunger 8 are drawn up the shaft past inlet 4A. A flow path is thus created between inlet 4A and outlet 6. This allows a gas or other fluid to flow between inlet 5 and outlet 6, via chamber 2 and inlet 4A.

The flow is increased by moving the valve member 8 further up the housing 1. This movement is achieved in the following manner: when coil 11C is activated, the power to coil 11B is simultaneously turned off. The activation of coil 11C pulls magnetic element 9B entirely within coil 11C, pulling valve stem 7 further up housing 1. As coil 11B has been deactivated there is no resistance to the movement of magnetic element 9A through and out of coil 11B. The activation and deactivation of coils is either instantaneous or with some energisation cross-over.

This moves the valve member to position 3 in FIG. 3. In this position at least inlet 4A is fully exposed providing a direct flow path between inlet 5 and outlet 6 via at least inlet 4A.

To increase the flow, the valve member is moved further up housing 1. This is achieved by turning on the power to magnetic coil 11A and simultaneously deactivating the power to coil 11C. Magnetic element 9A is pulled entirely within coil 11A from its position halfway between coils 11A and 11B. Thus valve member moves further up housing 1.

The magnetic elements 9A, 9B, 9C and coils 11A, 11B, 11C are now located as shown in FIG. 3D. In order to increase the flow further, valve member is moved further up the housing 1. This is achieved by turning off the power to coil 11A, and turning on the power to coil 11B. The activation of coil 11B pulls magnetic element 9B entirely within coil 11B from its position halfway between coil 11B and coil 11C. The deactivation of coil 11A allows magnetic element 9A to move out of its position within coil 11A into the position shown in FIG. 3E, FIG. 2 shows that FIG. 2 shows that inlets 4A and 4B are now both fully exposed, allowing an increased flow.

The valve member is moved still further up the housing 1 to further increase the flow by turning off power to coil 11B and turns on power to coil 11C. This pulls magnetic element 9C entirely within coil 11C, and allows magnetic element 9B to move out of coil 11B, thus moving the valve member further up the housing 1. Then, power to coil 11A is activated at the same time as power to coil 11C is deactivated. Magnetic element 9B is pulled entirely within coil 11A, and allows magnetic element 9C to move out of coil 11C. This position is shown in FIG. 3G. The next step pulls the valve into the fully open position. In this step coil 11B is activated at the same time as coil 11A is deactivated. This pulls magnetic element 9C entirely within coil 11B. At this point spring 13 is compressed or close to fully compressed against the closed end of housing 1 and all of inlets 4A, 4B, 4C, 4D and 4E are exposed, allowing maximum flow between inlet 14 and outlet 6.

The switching sequence described above is usually reversed to gradually close the valve. However when power to all the coils 11 is deactivated, the spring 13 will return the valve stem 7 to the neutral or closed position automatically. This has the advantage of cutting flow through the valve in the event of a power failure. In case of a non horizontal installation of the valve when the outlet 6 is placed lower than any other part of the piston housing 3 then the shutoff force can be provided by the weight of the moving parts such as stem 7, piston 8, magnetic elements 9 and spacers 10. Stem 7 can also be additionally urged toward the outlet by the fluid pressure behind the piston 8.

If required, valve shut off can also be performed by means of a reset button (not shown) which activates the closing sequence. It will be clear from the above description that different flow profiles and rates of flow can be achieved by varying the elements, as would be obvious to one skilled in the art. For example, varying the number of coils 11, or magnetic elements a number of inlets 4 and the size of each of the inlets 4 will all change the flow rate profile. Any or all of these integers could be varied to create the desired flow metering profile and resolution.

Figure 4:
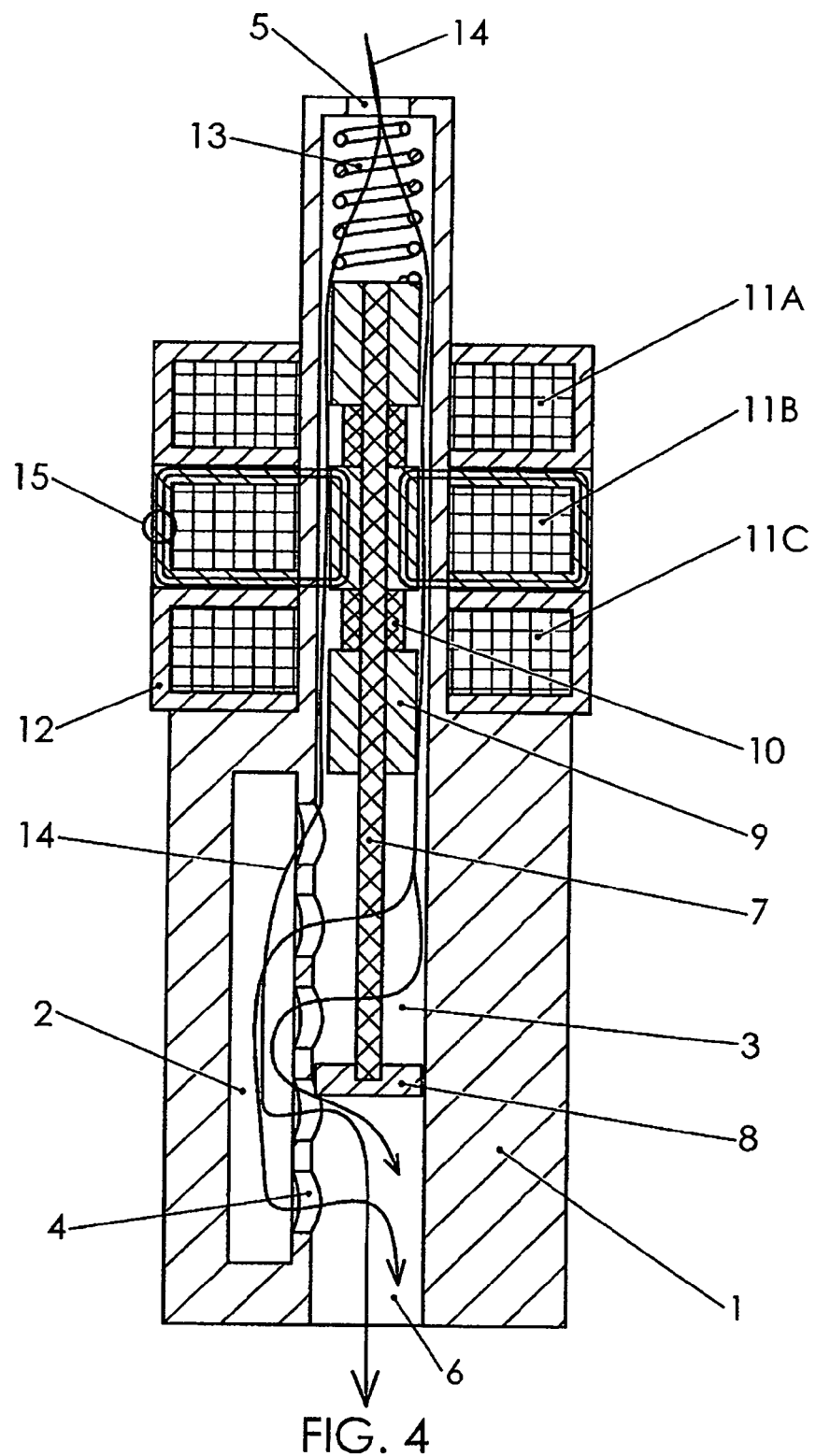
FIG. 4 shows a cross-sectional view of an alternative embodiment of the valve of the present invention.

In an alternative embodiment illustrated in FIG. 4 master inlet 5 is located at the top end of the housing 1. Gas or other fluid thus enters housing 1 at the top end, and flows around the spring 13. In this embodiment magnetic elements 9A, 9B and 9C have a cross-sectional profile which is substantially less than the cross-sectional profile of the inside of housing 1, so that the gas or other fluid may flow along the length of the housing 1, between the inner surface and magnetic elements 9A, 9B and 9C, the flow being shown by arrows 14. As the gas or fluid reaches the lower portion of the valve, it flows out of housing 1 into cavity 2 via one or more of inlets 4E, 4D, 4C, 4B and 4A. In the fully closed position all of these inlets are available for this use. As the valve shaft 7 is moved up the housing 1, using the same or a similar activation sequence as has already been described for the first embodiment, the movement of piston 8 up the housing 1 exposes, in sequence, inlet 4A, 4B, 4C and so on, creating a flow path between these inlets and outlet 6. The flow path is thus created, where the gas or fluid flows in through inlet 5, down the housing 1 through at least inlet 4E into chamber 2 then out of at least inlet 4A and out of outlet 6. This embodiment has at least two possible advantages over the first embodiment: a valve closed position can be created with the spring 13 in a fully uncompressed position with piston 8 closing off outlet 6. A second closed position can also be created with the spring 13 in a fully compressed position with piston 8 blocking the flow 14 of gases or other fluid down the housing 1, and stopping gases from entering chamber 2 through any of inlets 4A-E. With this embodiment quite a different flow profile is created when using the same activation sequence, due to the flow passing through two complementary subsets of the openings.

Figure 5:
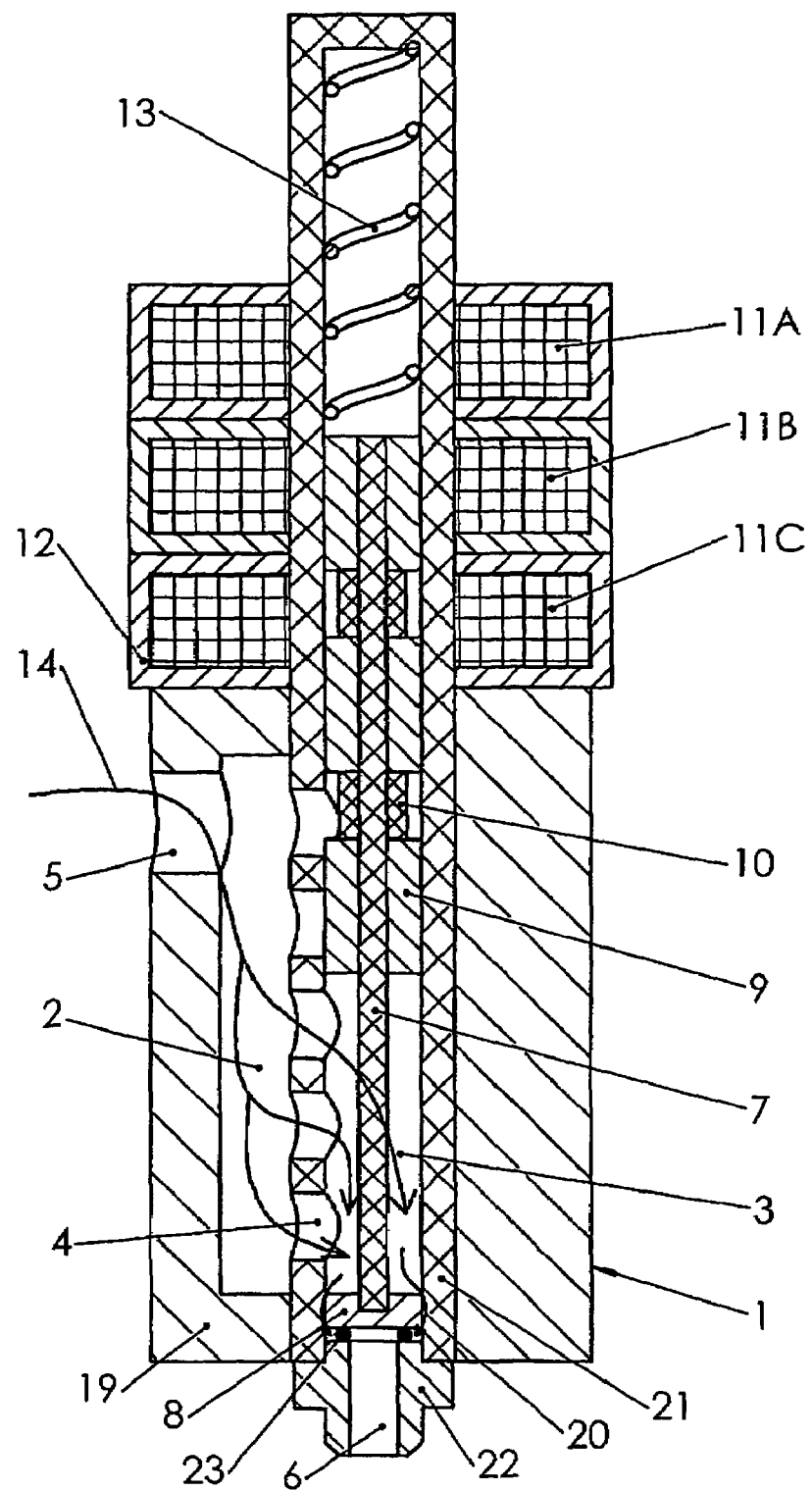
FIG. 5 shows a cross-sectional view of a valve of the present invention with the additional safety sealing.

Another embodiment illustrated in FIG. 5 has an outlet fitting 22 mounted into the outlet 6 with a seal such as a rubber o-ring 23 incorporated to prevent any bypass leakage 20. In this embodiment the housing 1 includes two parts, a hollow part 19 and a piston housing 21. This embodiment provides a production advantage for making the housing.

Figure 6:
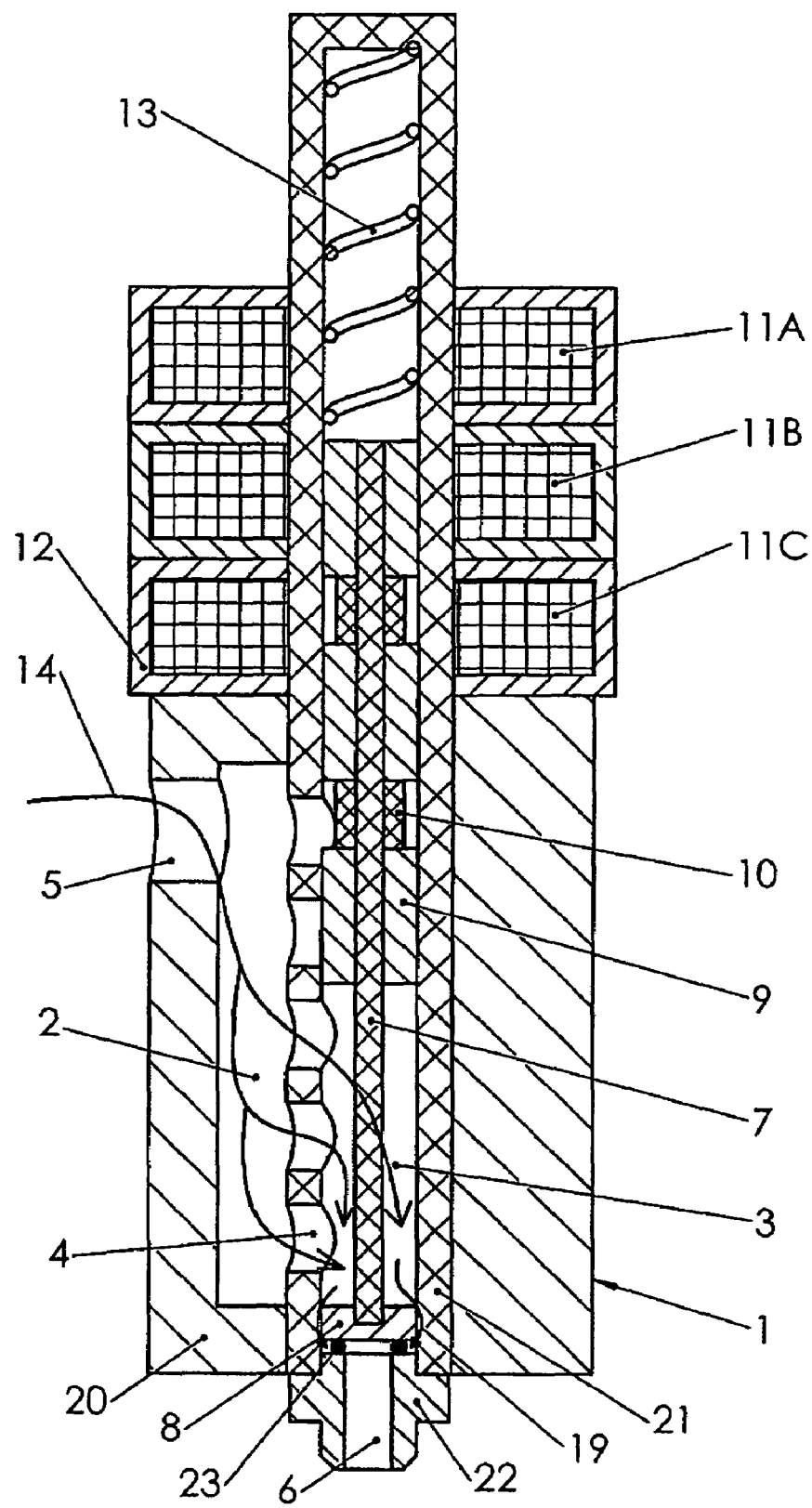
FIG. 6 shows a cross-sectional view of a valve of the present invention with two coils energized together.

To reduce the power consumed by the actuator coils 11 and retain the pull force of the actuator, or to increase the force, the actuator may have more than one set of coils simultaneously energized. Such an embodiment is illustrated in FIG. 6 where two coils 11 are simultaneously energized creating magnetic fields that attract magnetic elements 9. If one coil for example has 1000 turns and is connected to a 100 VDC power supply where the current through the coil is 0.1 A, then the coil consumes 10 W of electrical power and generates a MMF (Magnetic Moving Force) equal to 100 [Amp*Turns]. By ignoring the saturation of magnetic elements 9 we can assume that the MMF is proportional to the pull force of the actuator. To increase the MMF without changing the number of turns and type of winding wire, it is possible to increase the current which requires an increase in voltage. Doubling the voltage (to 200V instead of 100V) would double the current (0.2 instead of 0.1) and double the MMF (200 Amp*Turns instead of 100 Amp*Turns). However this quadruples the consumed power (40 W instead of 10 W). However by instead this using two similar coils at 100 V and 0.1 Amps we can obtain double MMF consuming only 20 W.

Figure 7:
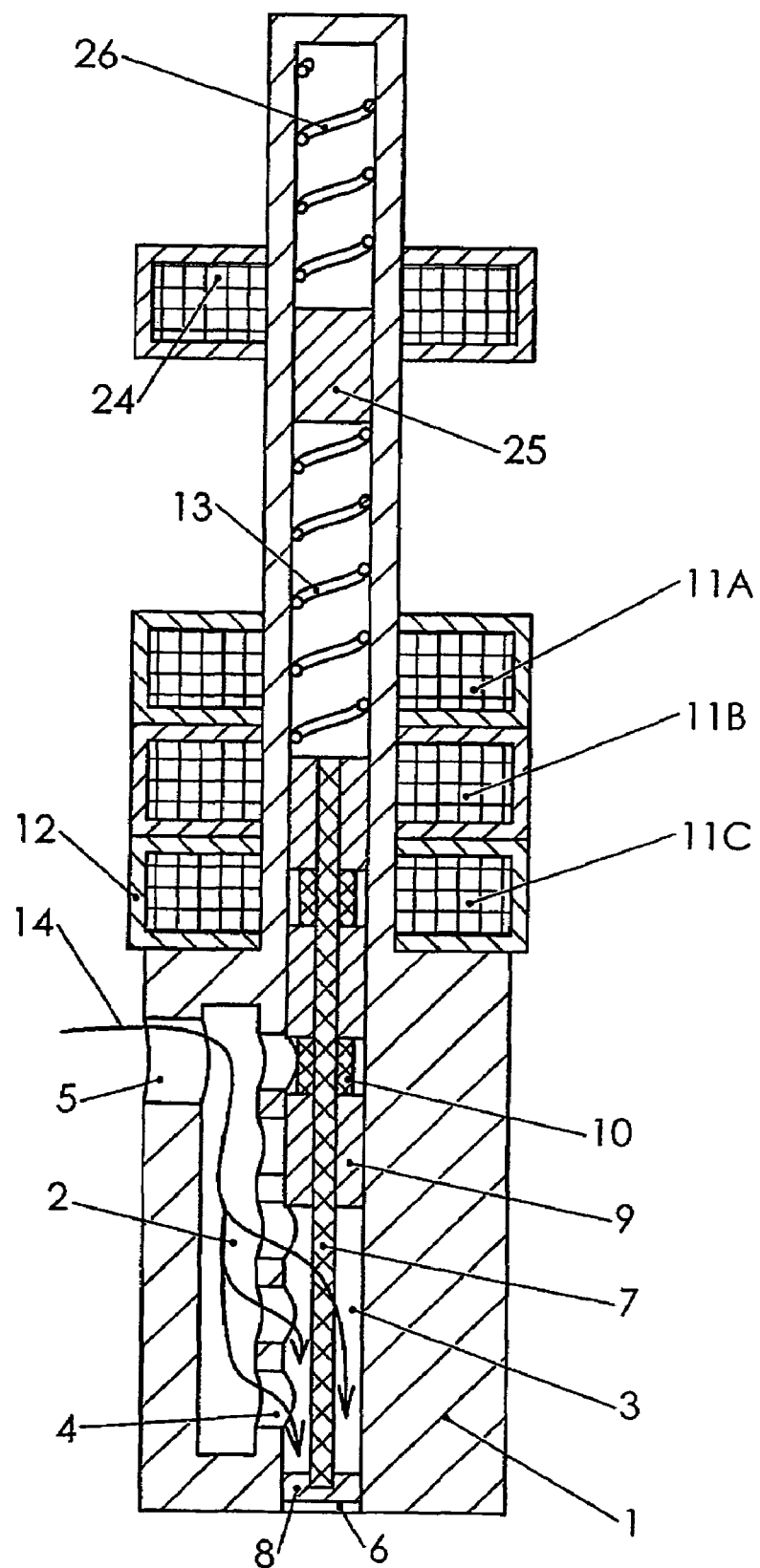
FIG. 7 shows a cross-sectional view of a valve of the present invention with an additional coil, magnetic element and biasing means in the fully closed position.
Figure 8:
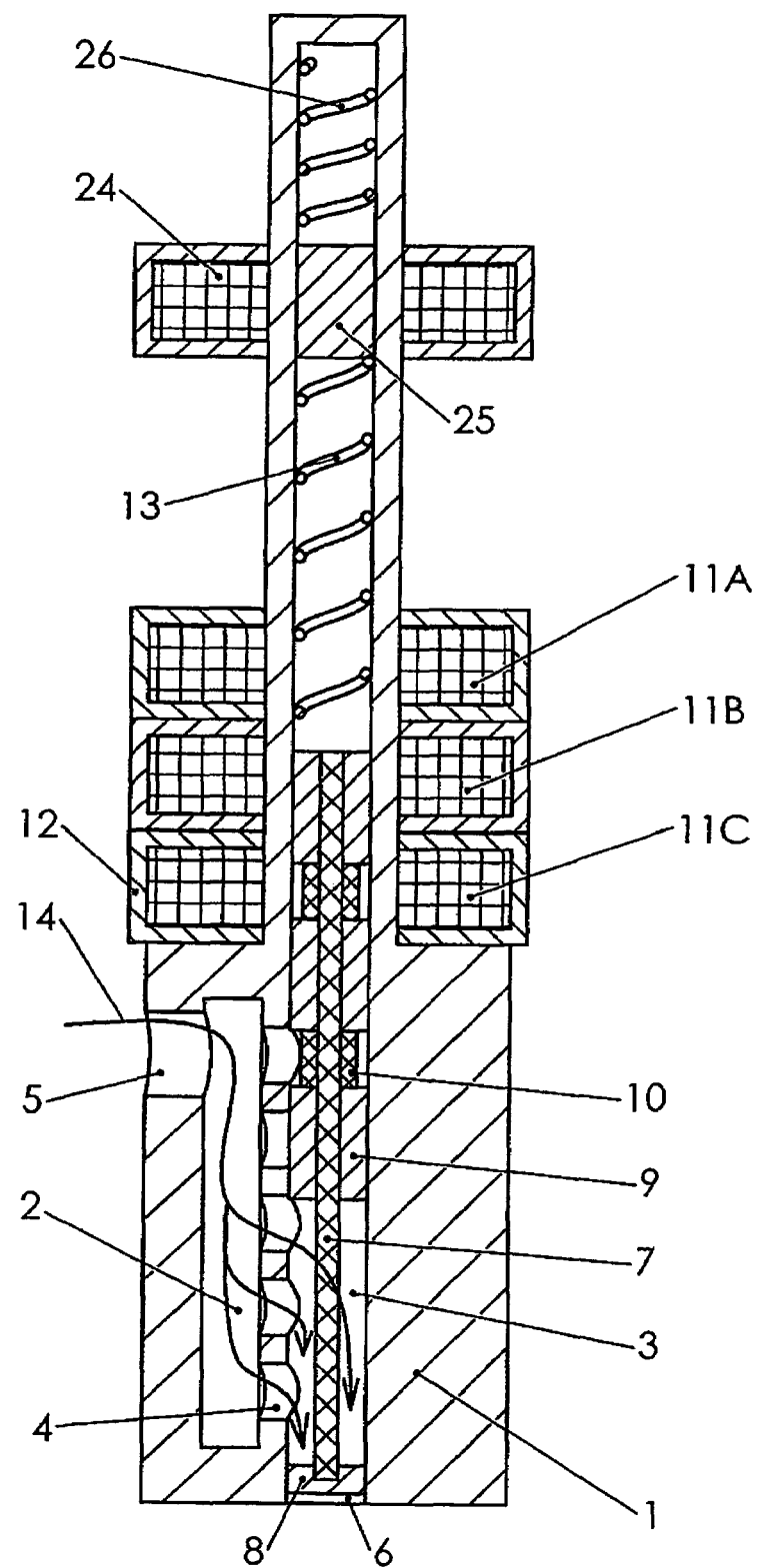
FIG. 8 shows a cross-sectional view of the valve of FIG. 7 with the additional coil energized, and additional biasing means compressed.

A further embodiment is illustrated in FIG. 7. In this additional embodiment coil 24 interacts with additional magnetic element 25. A secondary biasing means, in the form of spring 26, is located between the additional magnetic element 25 and the closed end of the housing 1. The first spring 13 is located between the shaft 7 and the additional magnetic element 25. When the additional coil 24 is energised as illustrated in FIG. 8, the additional magnetic element moves within coil 24 thus increasing the working area for spring 13, reducing the force required to move the shaft which means less reduced MMF and power to the coils 11.

Figure 9:
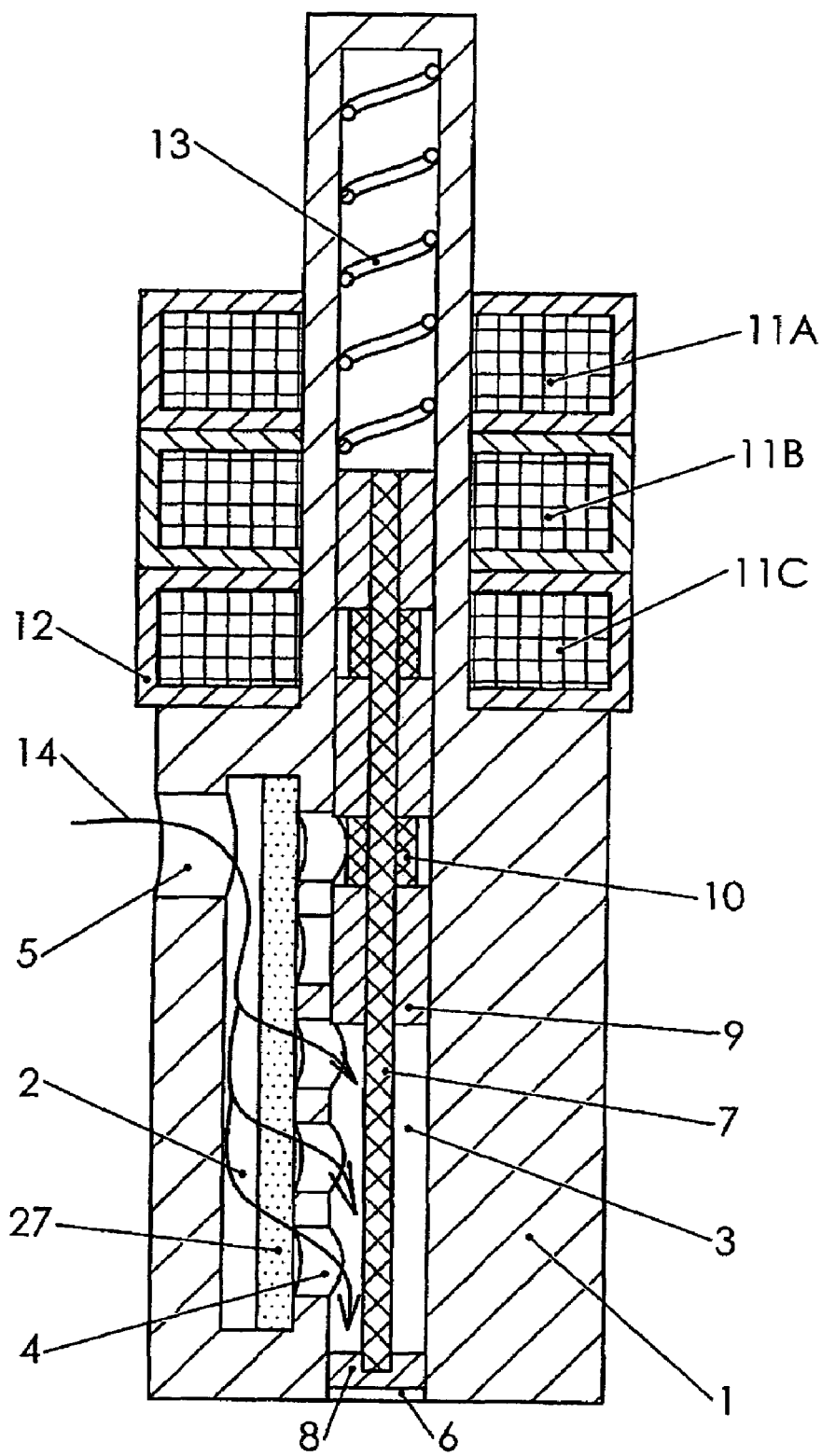
FIG. 9 shows a cross-sectional view of a valve of the present invention with a gas filter between the inlet and apertures.

A further embodiment is illustrated in FIG. 9. In this embodiment the inlets 4 are separated from the master inlet 5 by a filter 27 to prevent the inlets 4 from being clogged The embodiment illustrated in FIG. 10 has a flow restricting insertion 28 between the master inlet 5 and inlets 4. A reduction in cross sectional area of the insertion inlets 29 results from the overlapping of the inlets 4 by the inlets 29. This restricts the fluid flow to the valve. In the position of the restricting insertion 28 is adjustable so the same valve can be used to reduce different master flow rates to match a maximum or safe flow rate specified for an appliance.

Figure 11:
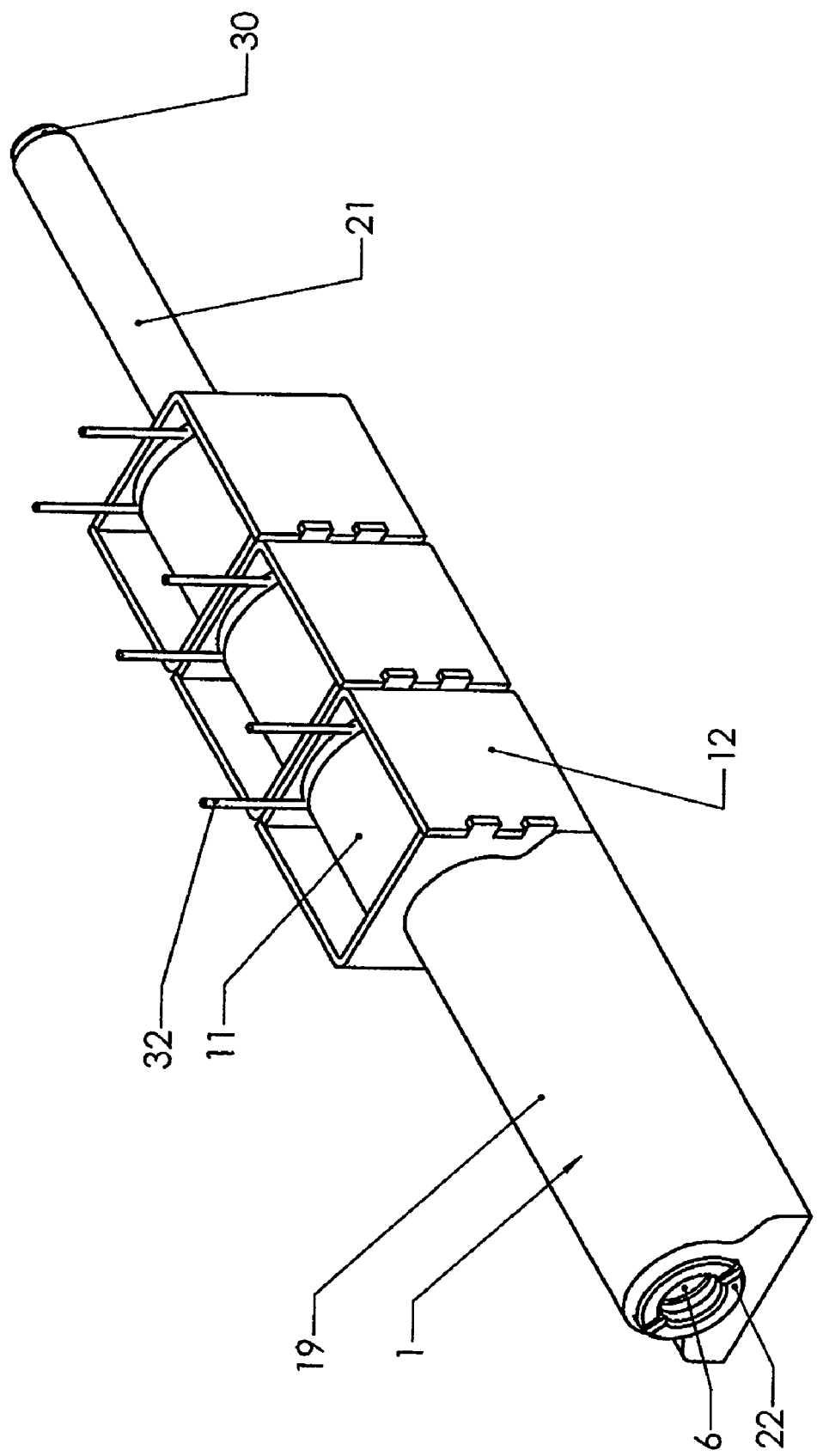
FIG. 11 shows an isometric view of a valve according to another embodiment the present invention.
Figure 12:
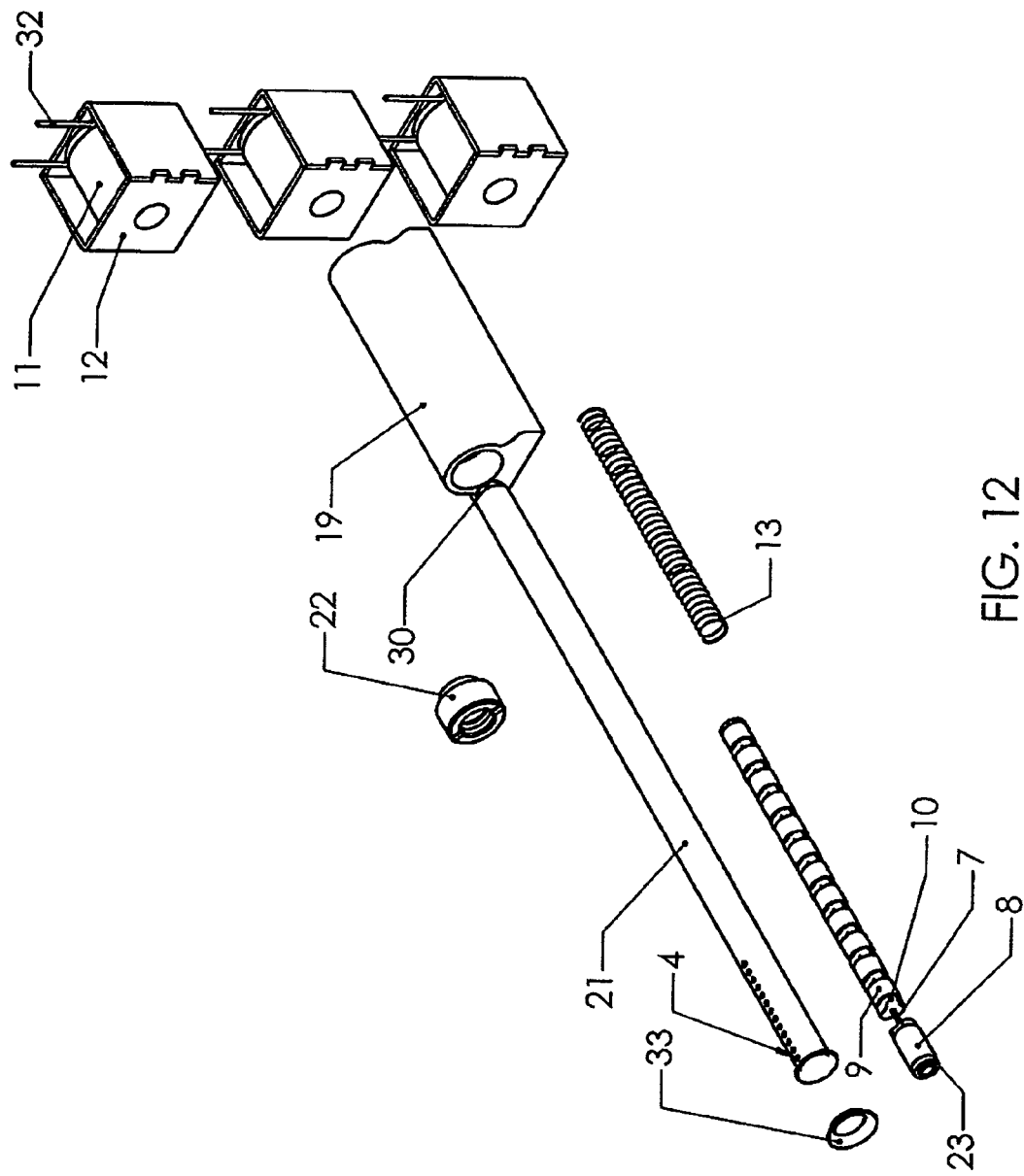
FIG. 12 shows an isometric exploded view of the valve of FIG. 11.
Figure 13:
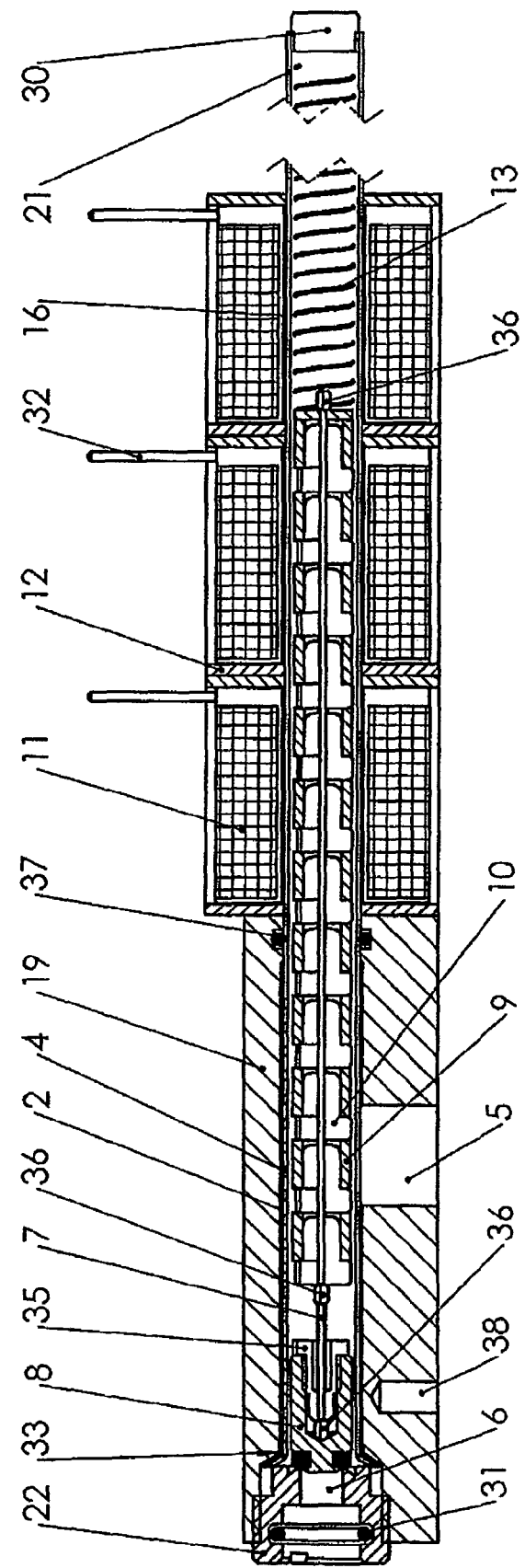
FIG. 13 shows a cross sectional view of the valve of FIG. 11.

FIGS. 11-13 show a working prototype of the variable flow valve where items not shown before are: a cap 30 sealing the piston housing 21; a sealing o-ring 31 to seal the connection inside the tube and prevent leakage to the atmosphere; coil terminals 32 to connect the coil windings to the power supply; a seal 33 to prevent fluid leakage from chamber 2 to the outlet or atmosphere by bypassing the piston housing 3. The material of the seal depends on the type of fluid metered by the valve. The working prototype used silicone rubber; screw 35 for mounting the valve member 7 to the piston 8; crimps 36 on the valve member 7 to tighten it to the piston 8 by screw 35. This also prevents the position of the magnetic elements 9 and spacers 10 from moving; a sealing o-ring 37 is used to prevent any fluid leaking between the hollow part 19 of the body 1 and the piston housing 21; an aperture 38 for accepting a screw provides a mounting means for the device inside an appliance.

This prototype embodiment has twelve magnetic elements 9 mounted along the length of the valve member 7. The extra magnetic elements allow for a finer motor step resolution than the embodiment shown in FIGS. 1-10.

There are a series of holes 4 shown in the valve wall. Each of these holes increases the total cross sectional area of the flow path seen by the gas or fluid when exposed. In this embodiment each hole is sequentially exposed as the piston stem 7 is raised by the motor. The rate of change in the flow path cross sectional area can be tailored by predefining the diameter of each inlet hole 4 in the sequence. In this way, flow profiles can be designed depending on the particular appliance or application.

Each magnetic element 9 is fixed onto the valve member 7 with a separation calculated by formula (1). The magnetic elements 9 are approximately equal in diameter to the of the piston housing 21 diameter. There is a small gap between the sides of the magnetic elements and the cylinder walls. This allows some gas or fluid to flow between the surfaces at a fraction of the master flow rate.

The first two steps of the linear stepper motor raise the valve member 8 such that the seal formed beneath it and outlet 6 is broken, without exposing an inlet hole 4. These first two motor steps cause a reduction in the cross sectional area of the flow path seen by the gas or fluid between the valve member 8 and the piston housing 21, and is known as 'leakage flow'. This leakage flow precedes the rate of flow obtained by the exposure of the first inlet hole.

A spring connects between the top of the piston stem and the top of the cylinder housing. The spring biases the piston shaft toward the bottom of the housing. If there is no power supplied to the electromagnets then the spring will force the piston shaft down, closing the valve. This feature is advantageous in the event of a power failure or a warning from another sensor which may require a sudden shutdown. The force of the spring is less than the electromotive force of the electromagnets, and greater than the gravitational force from the weight of the piston.

Figure 14:
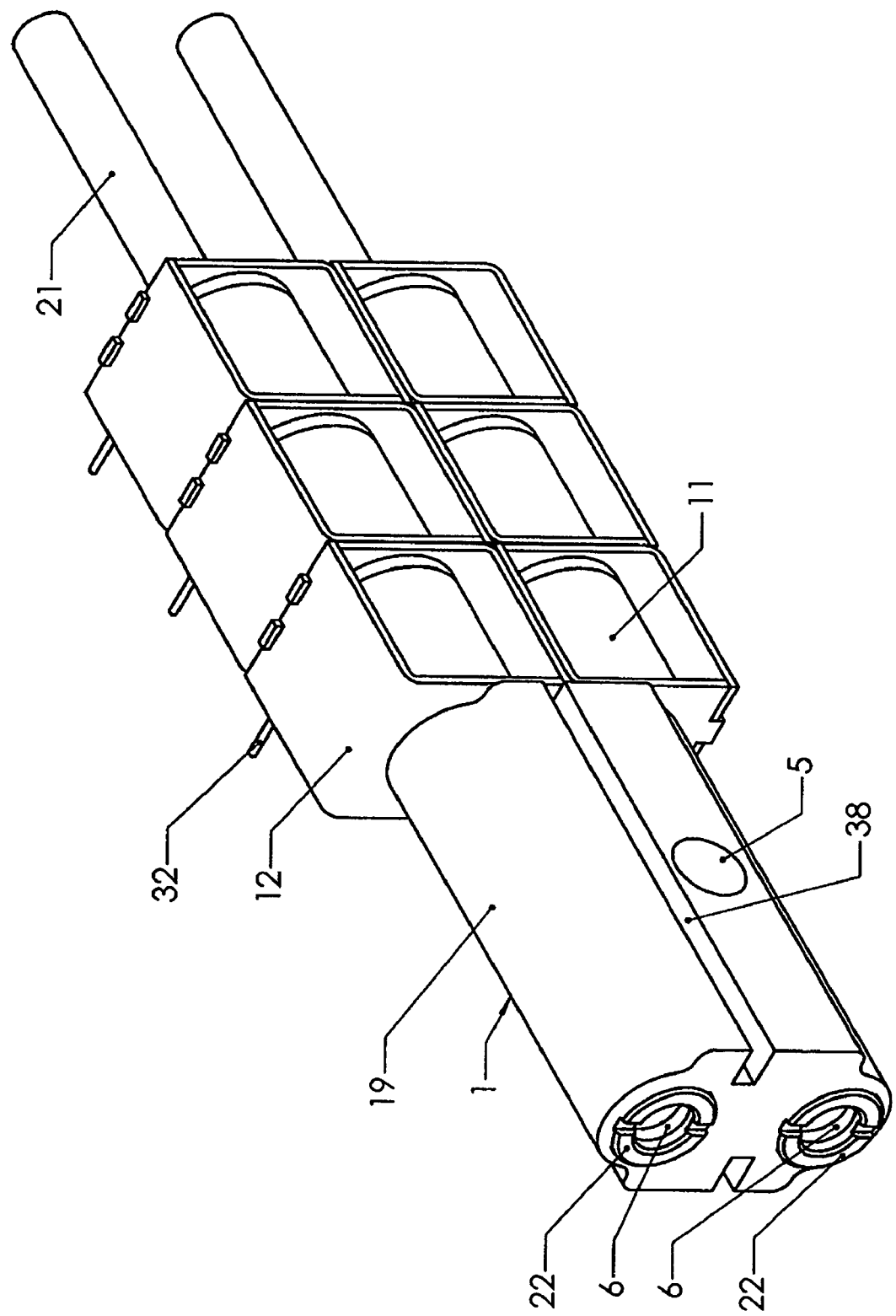
FIG. 14 shows an isometric view of two valves in accordance with the design of FIG. 11 having one body.

Another embodiment of the working prototype shown in FIG. 14 consists of two valves sharing a common housing. In this design the aperture 38 is a slot for self tapping screws. The slot is intended to assist in the mounting of the device to any intended appliance.

Figure 15:
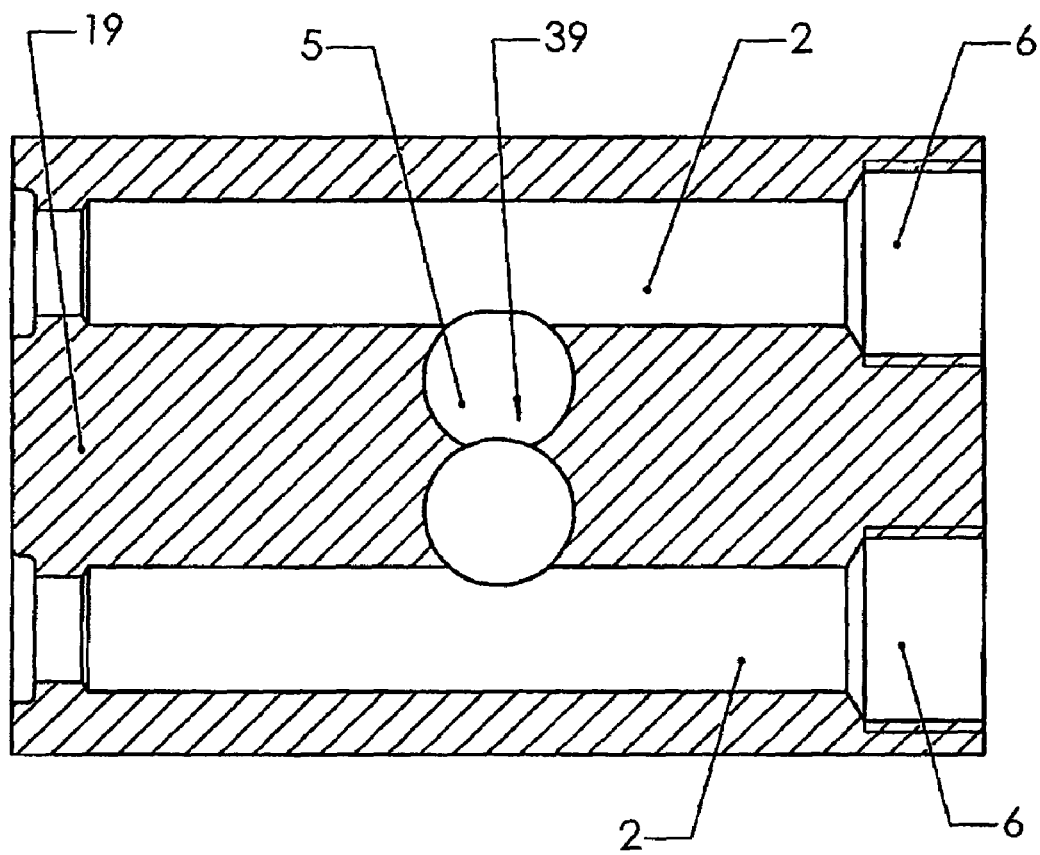
FIG. 15 shows a cross sectional view of the housing for two valves of FIG. 14.

FIG. 15 shows a cross sectional view of the housing 19 which has two chambers 2 connected to each other by two inlets 5 that are drilled from both sides of the housing. This forms a connection cavity 39. One of the inlets 5 can be blocked or sealed or used for connection to another valve.

Figure 16:
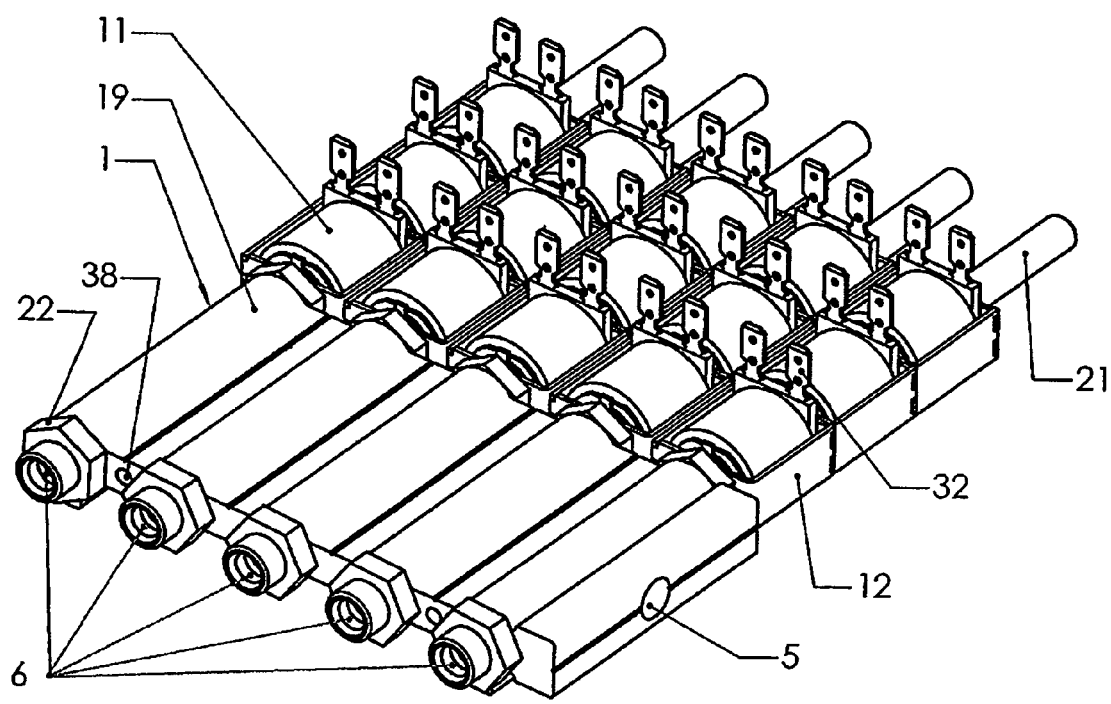
FIG. 16 shows an isometric view of five valves according to the embodiment of FIG. 11 having one body.

Another embodiment illustrated in FIG. 16 of the working prototype consists of five valves sharing a common housing.

Figure 17:
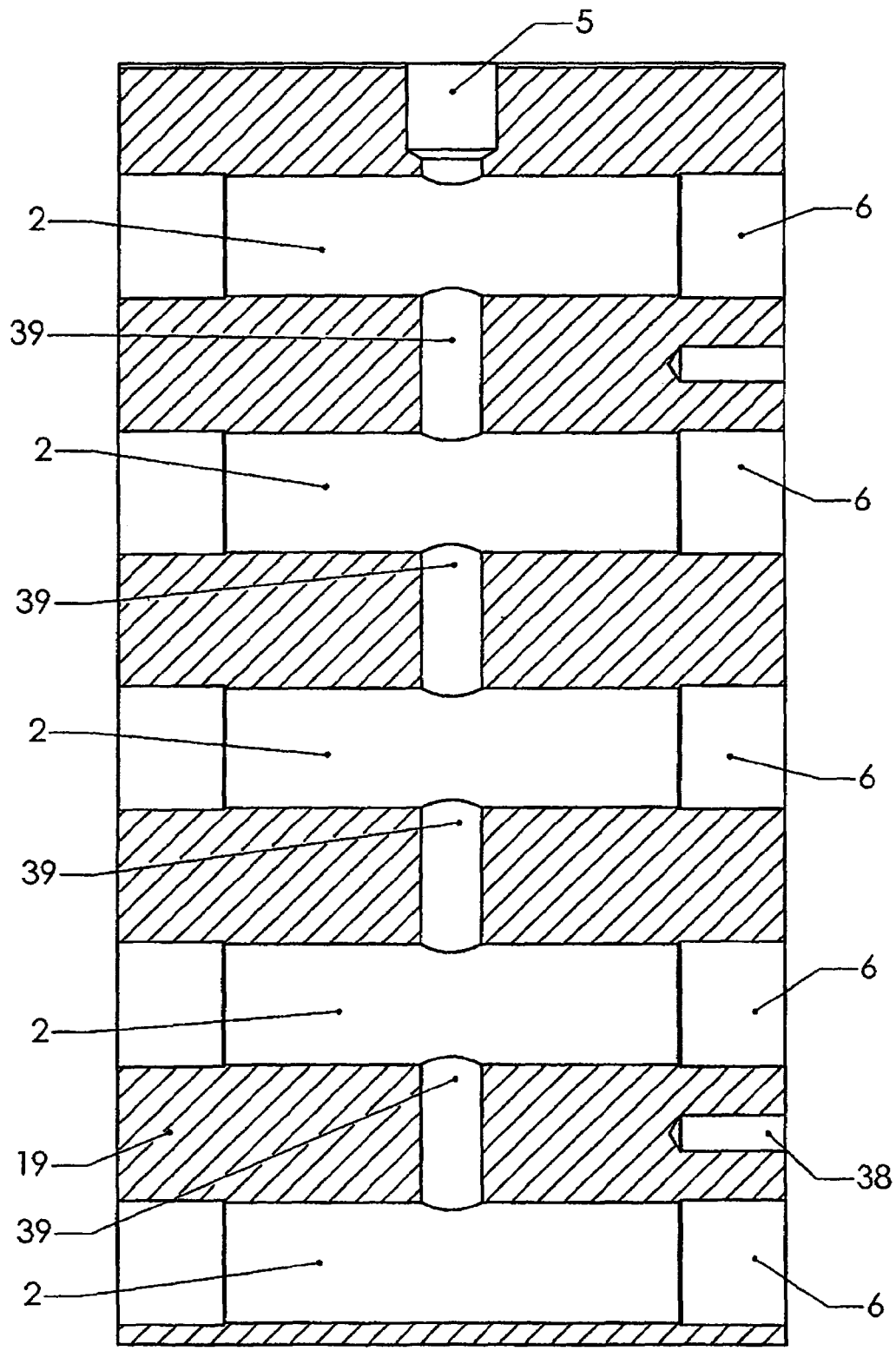
FIG. 17 shows a cross sectional view of the housing for five valves of FIG. 16.

FIG. 17 shows a cross sectional view of the housing 19 which has five chambers 2 connected to each other by a drilled hole 39.

The description above should be taken as exemplary of the invention of this application. Many different variants for example, a different number of coils and/or inlets and outlets could be used to create different flow rates or flow profiles without departing from the inventive concept as embodied in this application.

Figure 18:
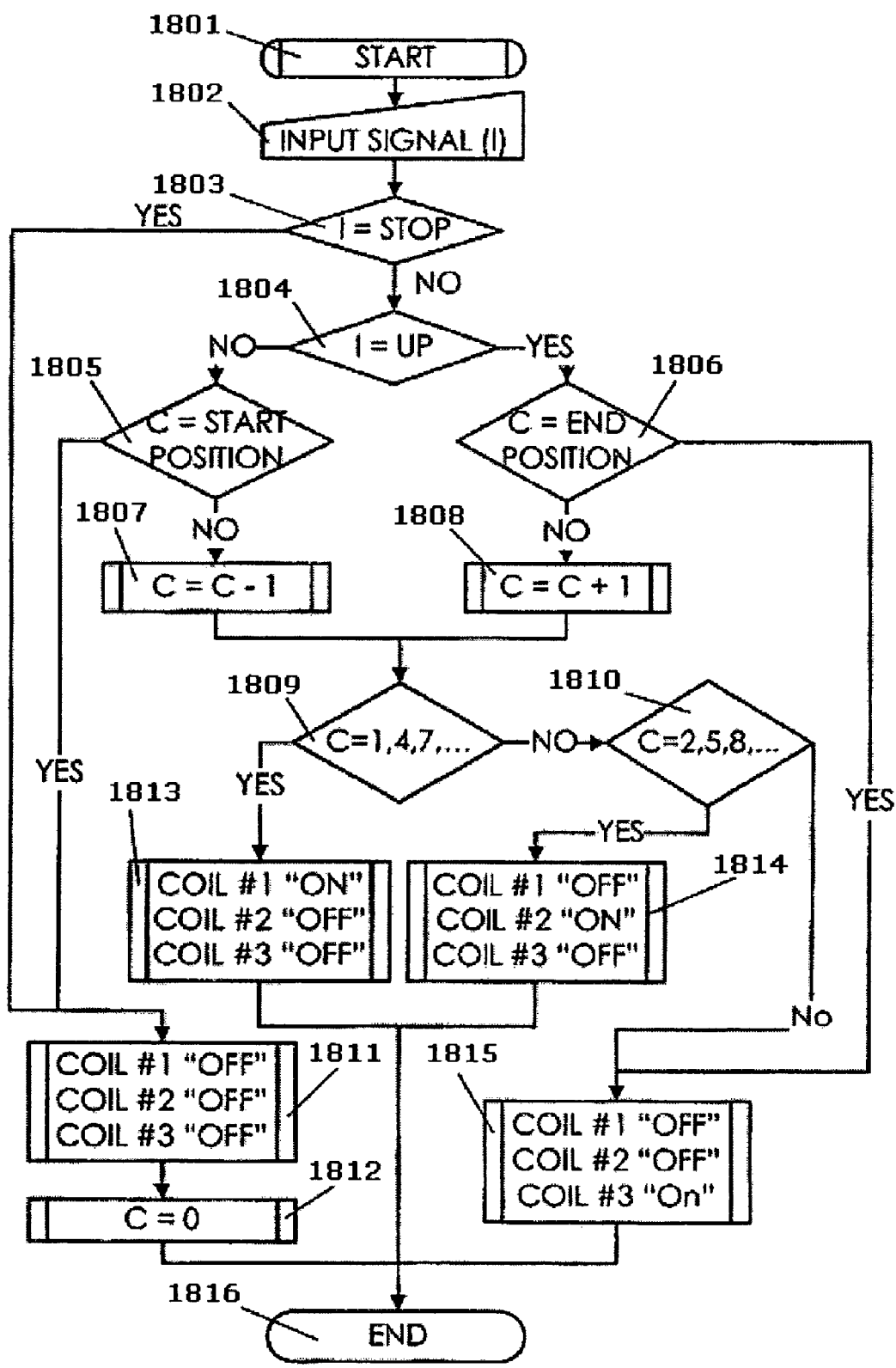
FIG. 18 shows a flow chart of a preferred embodiment of the valve operating software for controlling the valve of FIG. 11.

FIG. 18 shows a flow-chart illustrating the operational procedure of the valve. Note that this diagram describes software for a valve with three coils with a much larger number of working positions (preferably eighteen). The flow chart includes the following steps of the valve plus an OFF position:

1801. Start the procedure.
1802. Read signal "I" from operator or master controller. The signal values are "STOP"; "UP" and "DOWN".
1803. Compare signal "I" with "STOP" value. If I=STOP is true, GO TO Block 11, if—false=GO TO Block 4.
1804. Compare signal "I" with "UP" value. If I=UP is true, GO TO Block 6, if=false, GO TO the Block 5. Note that if I≠STOP or UP it means I=DOWN.
1805. Check the counter "C" value against the "Start position" which is the "Off position". If it is true, then GO TO the block 11, if false then GO TO the block 7.
1806. Check the counter "C" value against the "End position" which is the "Full On position". If it is true, then GO TO block 15 if false then GO TO the block 8.
1807. Decrease the counter value by 1.
1808. Increase the counter value by 1.
1809. Compare the counter value "C" with the sequence of positions when the coil #1 is ON (energized) which are 1, 4, 7, 10, 13, and 16.
1810. Compare the counter value "C" with the sequence of positions when the coil #2 is ON (energized) which are 2, 5, 8, 11, 14, and 17. When the "C" does not comply with conditions 9 or 10 it must be equal to a position from the sequence: 3, 6, 9, 12, 15; positions 0="Off" and 18="Full On" were checked before by the blocks 5 and 6.
1811. Disconnect all coils from the power supply.
1812. Energise coil #1 and disconnect the others.
1813. Reset the counter.
1814. Energise coil #2 and disconnect the others.
1815. Energise coil #3 and disconnect the others.
1816. End the procedure.

The described software defines forward and backward sequences and shut off operations only. Any signals from safety devices such as flame, occupancy, carbon monoxide, detectors and the like can be sent to the block 2 to shut off the valve or change its output.

Figure 19:
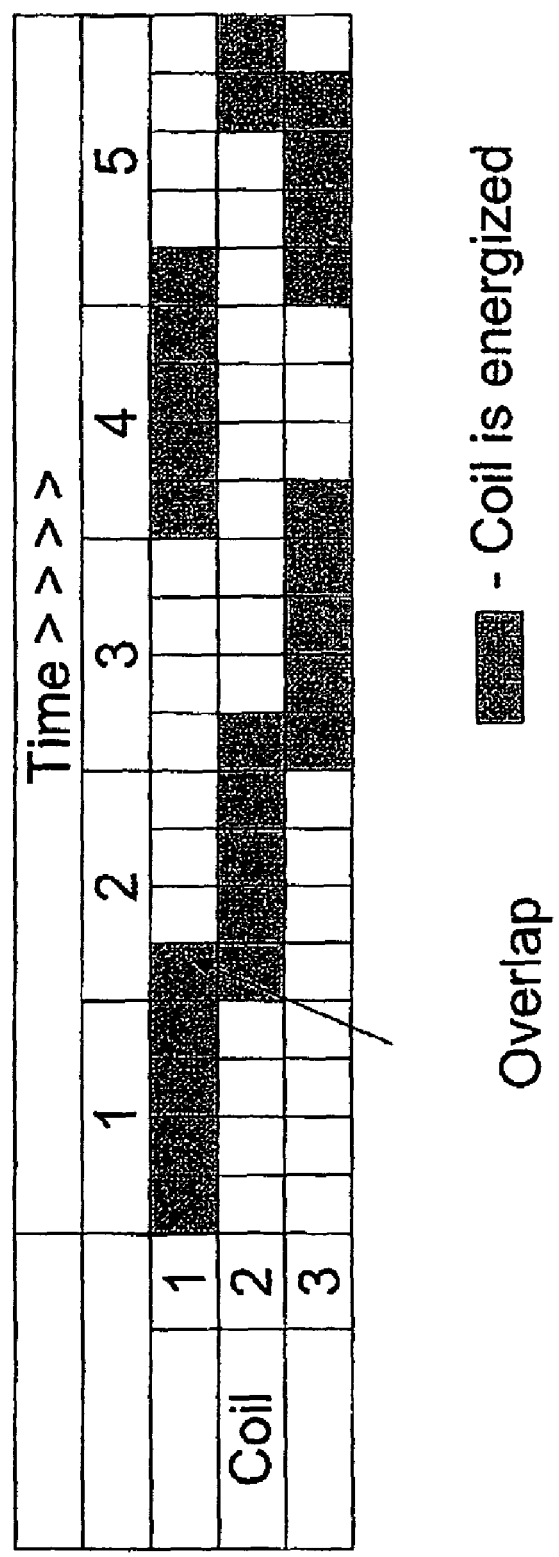
FIG. 19 shows an example of the preferred coil switching operation.

To prevent a stage loss during the switching between coils there is a period of time when two coils are energized simultaneously. This is called overlap and shown in the FIG. 19.

The force exerted by the coil on the magnetic element is greatest when the two magnetic centres 17 and 18 are aligned.

To increase the transitional pull force when changing the position of the valves the coils are energised by double the voltage used to hold the magnetic element stationary inside the coil. For example the coils of working prototypes (FIGS. 11, 14 and 16) draw 4.8 W at 12V during continuous operation. This power and voltage is doubled for transitional operation (changing the stage of the valve). Note that the transitional power is only applied for a fraction of second (100-500 milliseconds) and does not harm the coils.

Figure 20:
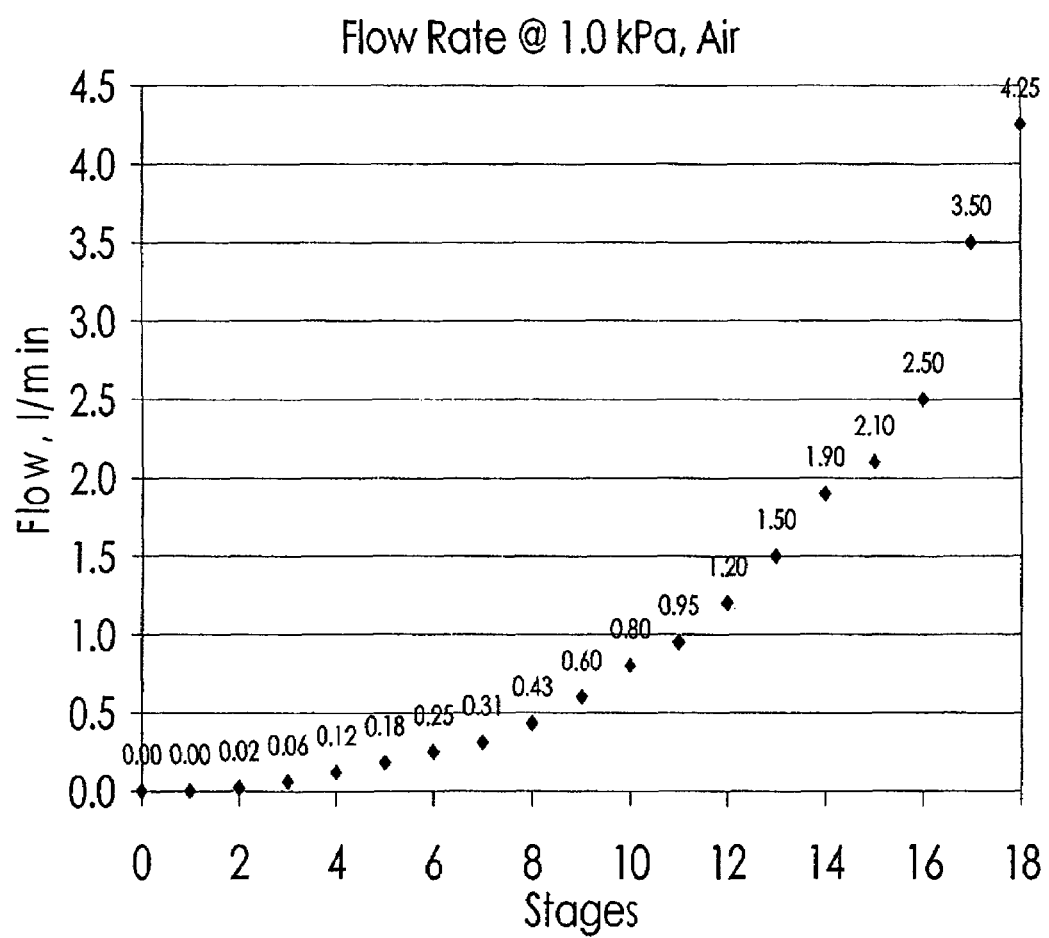
FIG. 20 shows measured air flow through the valve vs. opening stages at 1.0 kPa pressure.

FIG. 20 illustrates a rotational variant of the valve of the present. The valve includes a housing 95 that incorporates two circular plates. The valve also has an inlet 97 and an outlet 98. The first plate 90 is statically fixed and spans the entire width of the housing. This plate has a series of apertures 93 partway around a segment of the plate, at a fixed distance from the centre. These apertures 93 form the flow path of the valve. The second plate 92 also has a diameter to span the width of the housing 95. The second plate is mounted parallel to the first plate forming a seal between them. The second plate 92 has an aperture radially positioned to match the apertures in the first plate.

The second plate 92 is rotatable relative to the position of the first plate 90.

When the valve is set to stop the flow of the metered gas or fluid the aperture 91 in the rotational plate 92 will align with the segment of the fixed plate 90 without any apertures. This blocks the flow path. To start the flow of gas or fluid the plate 92 is rotated such that the aperture is aligned with the first hole in the fixed plate 90. Ideally the cross-sectional area of the first aperture in the fixed plate corresponds to the lowest desire rate of flow through the valve.

As the rotational plate is rotated further, the master aperture 91 aligns with a new selection of apertures. The series of apertures preferably incrementally increase in. The master aperture 91 may be large enough to expose all of the apertures in the valve plate simultaneously. Increasing flow rate may be provided by the number of exposed apertures progressively increasing, or by the size of the apertures progressively increasing.

The rotational valve plate is attached to a shaft which extends outside the valve housing.

The shaft can be connected to a control means which indexes the rotational position of the shaft.

The control means is ideally a rotational stepper motor 96 designed to electronically index the position of the shaft 94 thus controlling the rate of the flow through the valve.

Preferably a rotational torsion spring attached to the shaft provides an automatic return for the valve should power be inadvertently disconnected from the coils. A rotational stepper motor would hold the position of the shaft while power is applied to the coils of the motor. When the power is disconnected the holding force on the shaft is released.

Alternatively the shaft may be a hand turned control means where the shaft would incorporate a detent indexing mechanism (not shown). This method would be best suited for use with nonpowered appliances such as barbeques.

Figure 21:
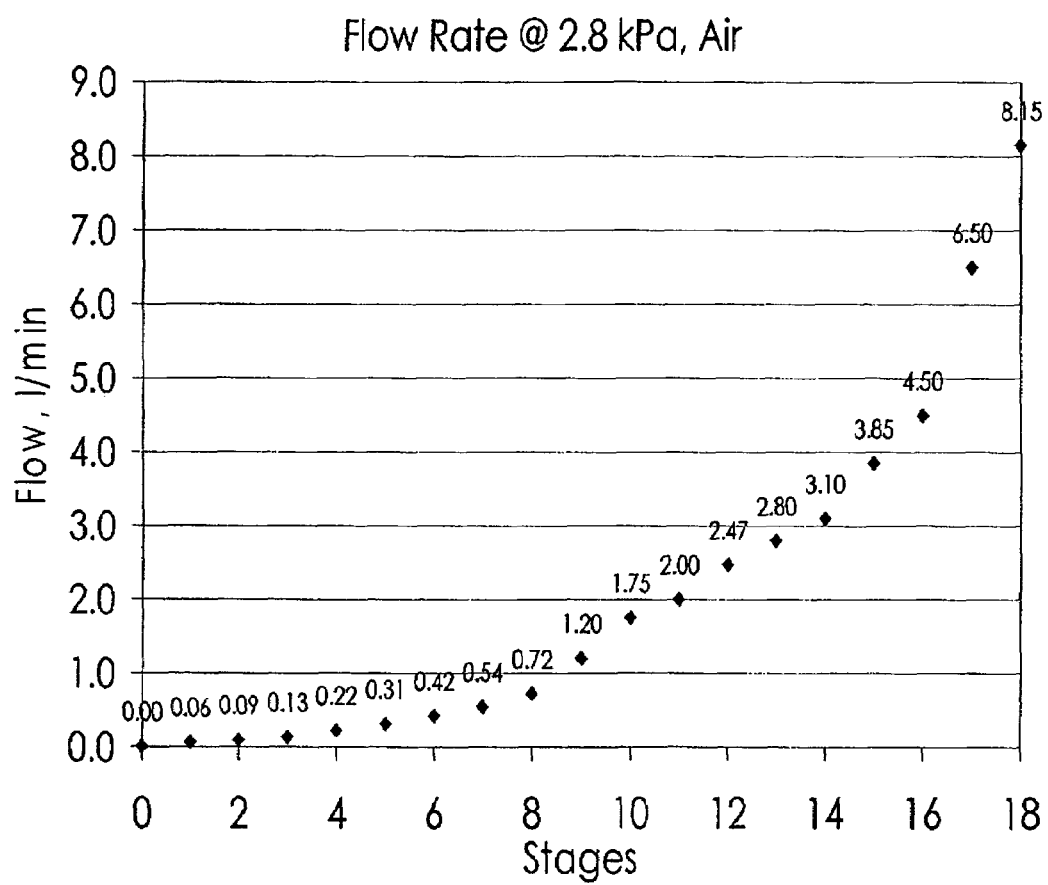
FIG. 21 shows measured air flow through the valve vs. opening stages at 2.8 kPa pressure.
Figure 22:
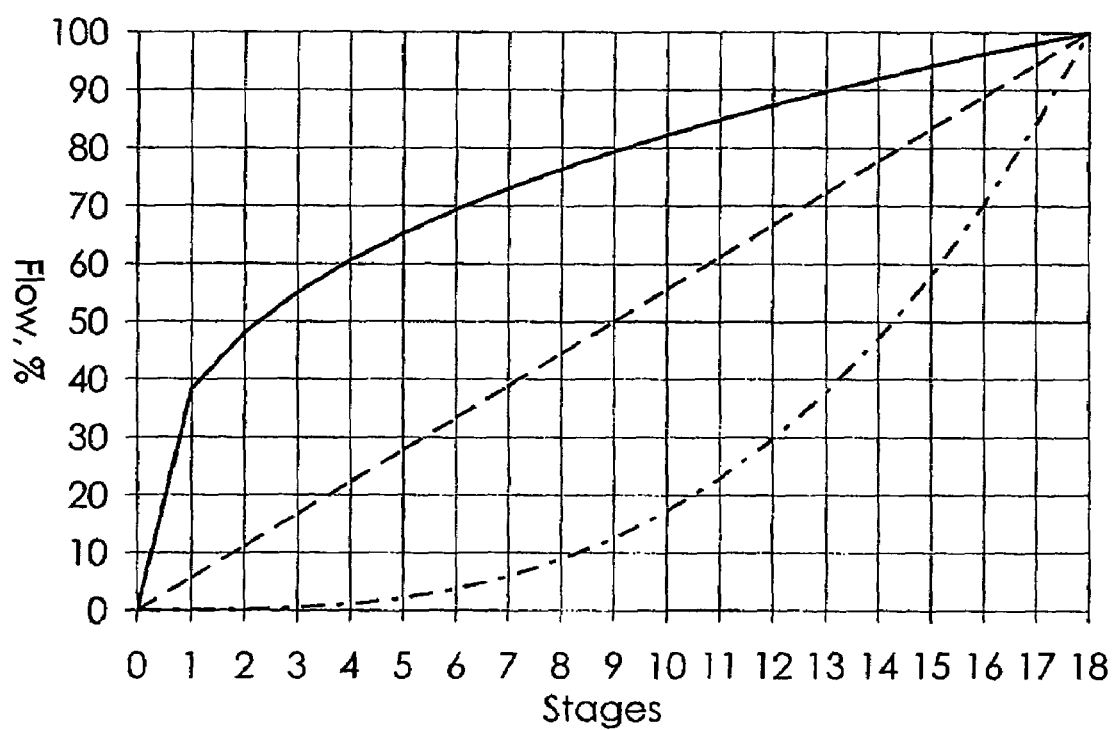
FIG. 22 shows possible output flow profiles that might be desired, and which the valve of the present invention could be made to provide.

FIGS. 20 and 21 show air flow test results of the prototype at different pressures where 1.0 kPa corresponds to mains natural gas supply and 2.8 kPa is a standard pressure for bottled LPG. The gas flow rates must be recalculated from the air output based on the relative (to air) gas viscosity and temperature. In accordance to these calculations the current prototype can supply constant burning energy from 75-750 to 16,000-31,000 BTU using Natural Gas, and from 600-6000 to 95,000-135,000 BTU using LPG. The deviations in the range depend on the quality of gases. The inlet 4 diameters are predetermined to provide a tailored flow profile. One such variation is from 0.15 mm to 1.20 mm. This arrangement has been tested in the prototype and successfully works with different sized burners providing a broad range of flame adjustment. For example the first ten stages (from 1 to 10) are used for the smallest burner and the last ten (from 9 to 18) for the biggest. Everything in between (from 4 to 13 or from 6 to 15) is used for middle size burners. This means that the valve settings can be digitally adjusted for different types of burners.

Figure 10:
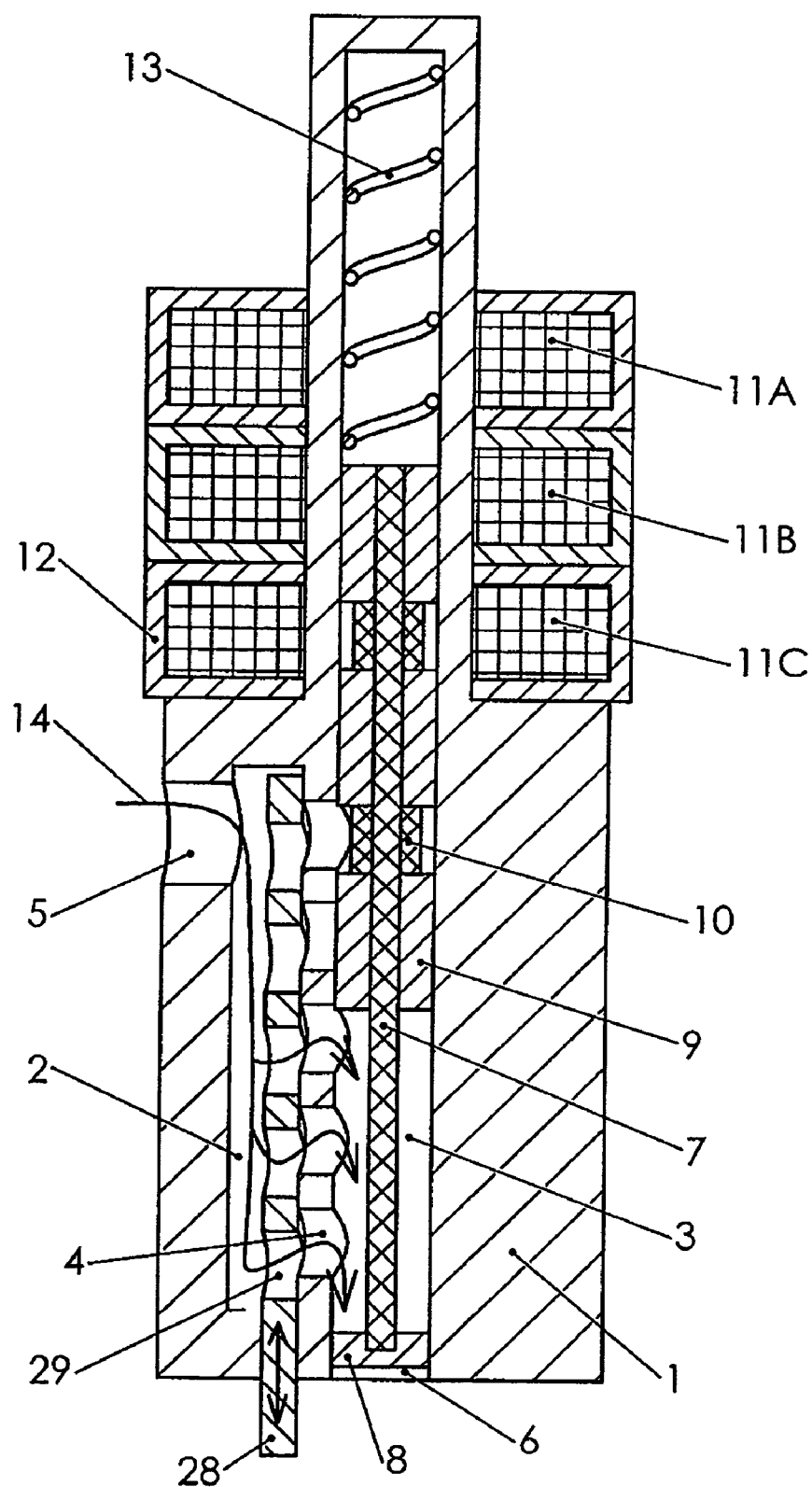
FIG. 10 shows a cross-sectional view of a valve of the present invention with a master valve between the inlet and apertures.

There are several options for manufacturing the inlets/orifices 4: high speed drilling; laser cutting; using the insertion 28 (FIG. 10) as a permanent insertion e.g. 3M high temperature aluminum foil tape 433 or 433L and punching the inlets with fine carbide wire where diameters start from 0.10 mm; and using the movable insertion 28 to adjust the overlapping cross sectional area between the inlets 4 and 29 (FIG. 10).

FIGS. 8 and 13 show piston 8 without any dynamic seal. Here piston 8 works inside a metal housing 21 and to move freely these two parts must have a clearance. This clearance causes a leakage 20 (FIG. 5). This leakage is used as a first stage of the flow.

Figure 23:
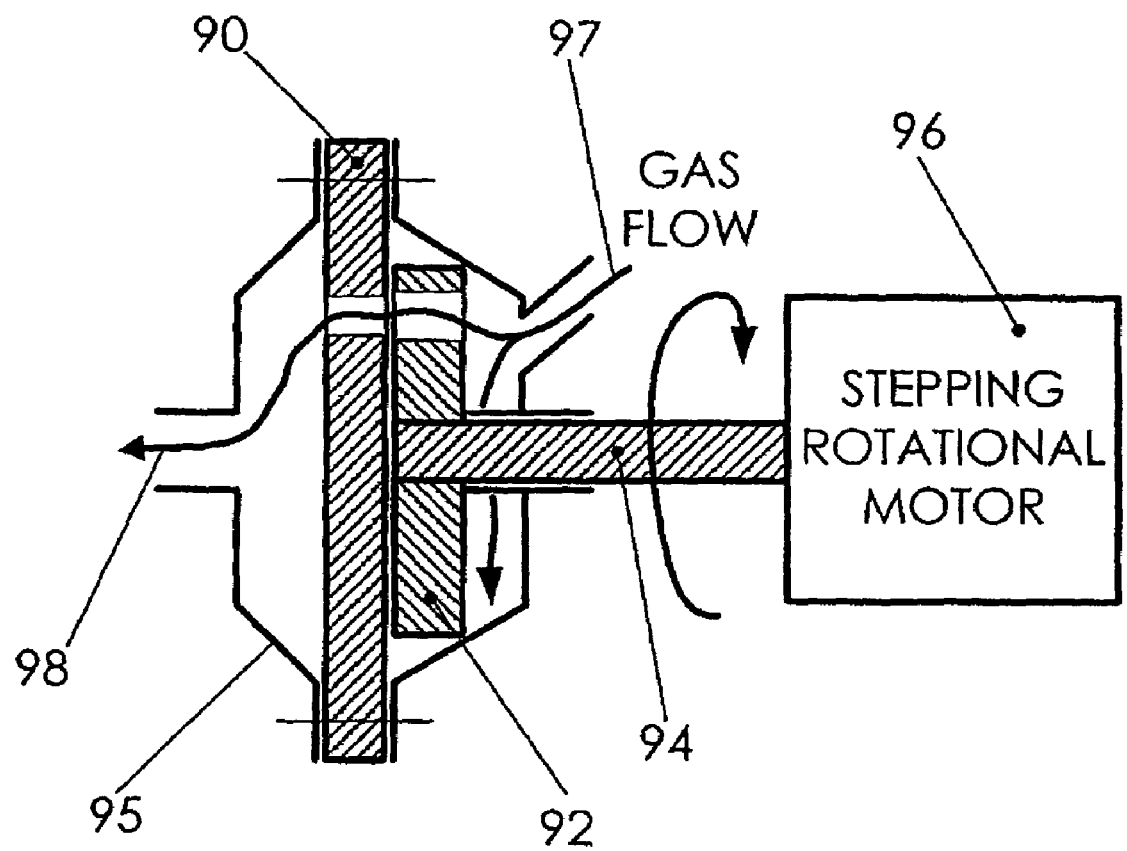
FIG. 23 shows a cross-sectional view of a rotational variant of a valve according to the present invention.
Figure 24:
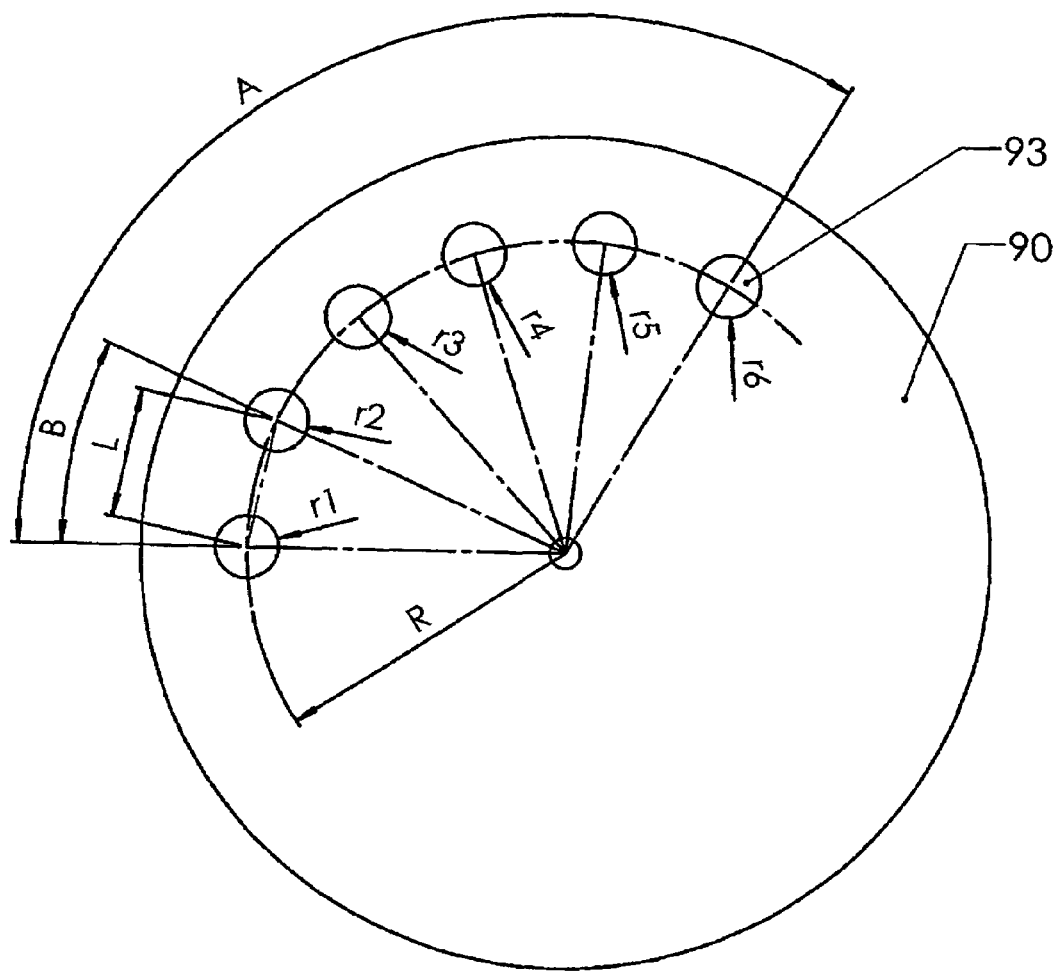
FIG. 24 illustrates the stationary plate housed within the valve for FIG. 23 having an arcuate series of apertures.
Figure 25:
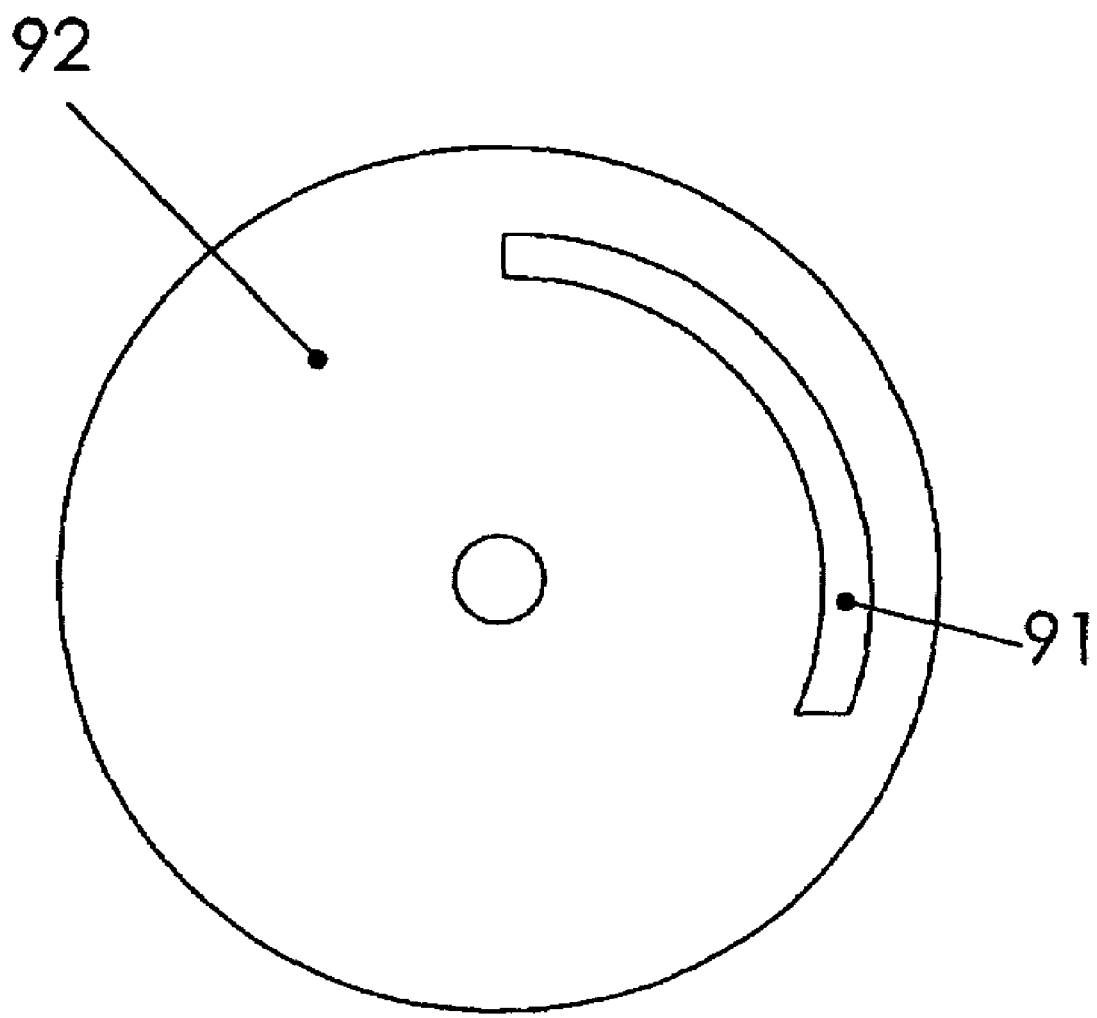
FIG. 25 illustrates an example of the valve plate in the valve of FIG. 23.

FIG. 23 shows possible flow outputs of the valve which can be continuously varied from 0 to 100%.

Figure 26:
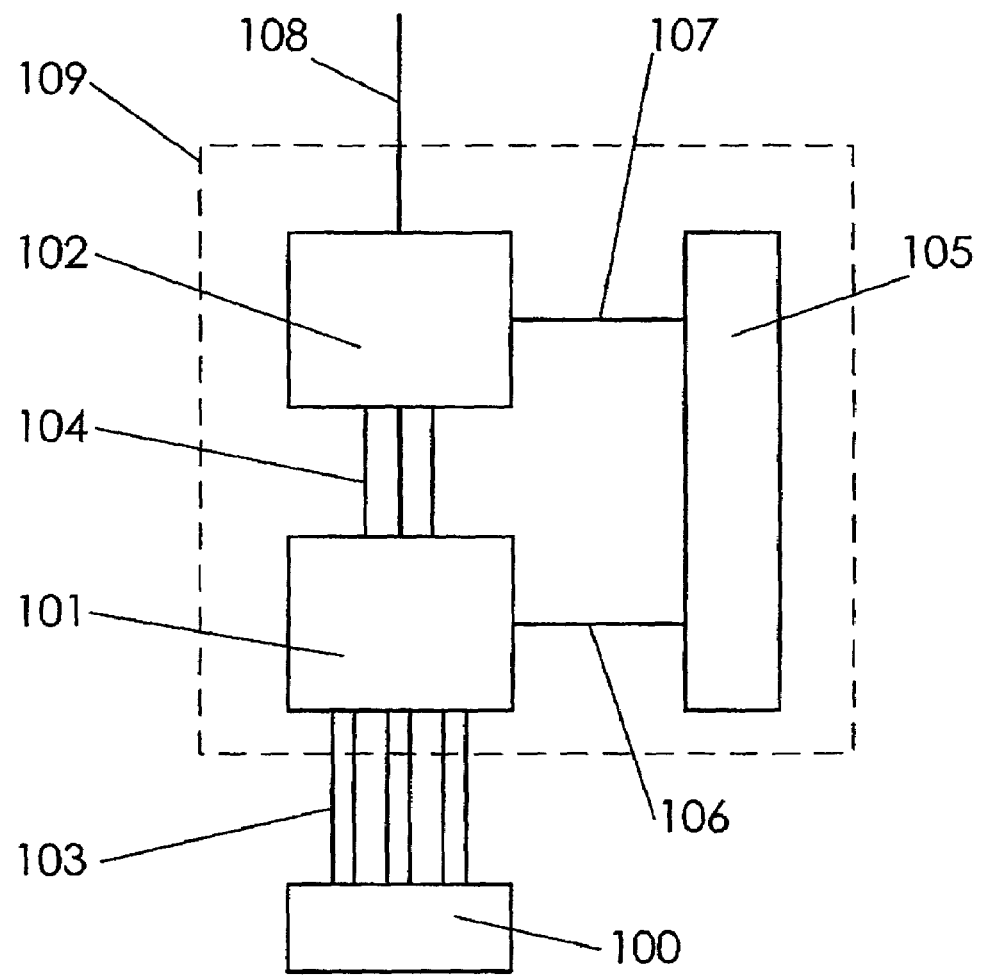
FIG. 26 is a block diagram illustrating a valve according to the present invention including control electronics.

FIG. 26 is a block diagram of the electronic modules required to operate the control valve in conjunction with the algorithm shown in FIG. 18. The control electronics receive an input signal 108 which specifies whether the valve is to be opened, closed or shut off. The microprocessor or discrete logic circuit 102 receives the input signal. In conjunction with the algorithm in FIG. 18 it generates a control signal specifying whether to apply or disconnect power from particular coils. The decision is sent to the power control module 101 via wires 104. The power control module 101 receives the control signal and amplifies it to the magnitude of power required by the coils to generate the electromotive switching force. The output of the power control module 101 is fed though wires 103 to the coils incorporated in the valve 100. A power supply unit 105 supplies a high current source to the power control module 101 through wires 106, and also supplies a low current source to the digital logic module 102 through wires 107. The control electronics are typically grouped and housed together in a working product as indicated by box 109. Alternatively the control electronics and device algorithm may be incorporated in an appliance master controller to directly apply current to the coils without an intermediate dedicated valve controller.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid metering valve, comprising:
   a housing having an inlet port and an outlet port,
   a fluid flow path between said inlet port and said outlet port,
   a valve member located in said housing in said fluid flow path, said valve member moveable among a series of indexed positions,
   said housing having a plurality of apertures arranged such that a varied selection of said apertures is in said fluid flow path according to the indexed position of said valve member, wherein varied selections of said apertures of each indexed position varies the flow volume permitted through the flow path via the selected one or more apertures, with no said apertures in said flow path for at least one said indexed position of said valve member;
   a stepping motor fixedly connected to said valve member, said stepping motor providing for movement between a plurality of predetermined positions, said indexed positions of said valve member corresponding with the predetermined positions of the stepping motor; and
   wherein said apertures are provided in an axial array and said stepping motor includes a linear array of magnetic elements operating within a set of axially spaced selectively energised coils.

2. The fluid metering valve of claim 1, wherein said apertures are in a dividing wall of said housing and said valve member operates to interpose between a selection of said apertures and said inlet or outlet port.

3. The fluid metering valve of claim 1, wherein said valve member interposes between a selection of apertures and said outlet port.

4. The fluid metering valve of claim 1, including a biasing means to return said valve member to said indexed position with no said apertures in said flow path.

5. The fluid metering valve of claim 1, wherein said valve member is located within a bore, having an outlet at a first bore end and a seat adjacent said outlet, and said valve includes a biasing means urging said valve member towards said seat.

6. The fluid metering valve of claim 1, wherein sizes of the apertures are not all substantially the same.

7. The fluid metering valve of claim 6, wherein the sizes of the apertures increase or decrease as a trend across at least four apertures.

8. The fluid metering valve of claim 1, wherein said varied selection of said apertures includes at least three said apertures for at least one said indexed position of said valve member.

9. A fluid metering valve, comprising:
   a housing having an inlet port and an outlet port,
   a fluid flow path between said inlet port and said outlet port,
   a valve member located in said housing in said fluid flow path, said valve member moveable among a series of indexed positions;
   said valve member and said housing having a plurality of apertures arranged such that a varied selection of said apertures is in said fluid flow path according to the indexed position of said valve member, with no said apertures in said flow path for at least one said indexed position of said valve member;
   stepping motor fixedly connected to said valve member, said stepping motor providing for movement between a plurality of predetermined positions, said indexed positions of said valve member corresponding with the predetermined positions of the stepping motor;
   wherein said apertures are provided in an axial array and said stepping motor includes a linear array of magnetic elements operating within a set of axially spaced selectively energised coils;
   wherein said valve member is located within a bore, having an outlet at a first bore end and a seat adjacent said outlet, and said valve includes a biasing means urging said valve member towards said seat; and wherein said housing includes a first body and a sleeve mounted in said first body, said first body including said inlet and an inlet manifold, around said sleeve, said sleeve including said axial array of apertures, said valve member operating in a bore of said sleeve.

10. The fluid metering valve of claim 9, wherein said valve member includes a stem and a plunger, at a first stem end of said stem, extending outward from said stem to substantially block said bore.

11. The fluid metering valve of claim 10, wherein a periphery of said plunger is pressed against said valve seat with said coils de-energised.

12. The fluid metering valve of claim 10, wherein said sleeve extends out of said first body and said coils are mounted over said sleeve, and said magnetic elements are mounted over said stem of said valve member, within said sleeve.

13. The fluid metering valve of claim 12, wherein said first body includes said bore therethrough to receive said sleeve, a radial seal at a second bore end of said bore adjacent said coils to seal against an outside of said sleeve, and said seat at the first end of said bore to receive a flared end of said sleeve, and a first plug engaged in said bore holding said sleeve in said bore with said flared end pressed against said seat.

14. The fluid metering valve of claim 13, wherein said first plug includes an opening therethrough, and
   an annular valve seat for said plunger at the periphery of said opening.

15. The fluid metering valve of claim 14, wherein said plunger has a resilient face and said annular valve seat has a sharp edge to press into said resilient face.

16. The fluid metering valve of claim 13, wherein a first sleeve end of said sleeve away from said first plug is closed by a second plug, and said biasing means comprises a spring retained in said sleeve between said plunger and said second plug.

17. The fluid metering valve of claim 9, wherein said housing has a port extending laterally to said bore, and
at least in a region of said port there is a clearance between said sleeve and said bore.

18. A fluid metering valve, comprising:
a housing having an inlet port and an outlet port,
a fluid flow path between said inlet port and said outlet port,
a valve member located in said housing in said fluid flow path, said valve member moveable among a series of indexed positions,
said valve member and said housing having a plurality of apertures arranged such that a varied selection of said apertures is in said fluid flow path according to the indexed position of said valve member, with no said apertures in said flow path for at least one said indexed position of said valve member; and
more than one set of magnetic elements and coils operating simultaneously and arranged in accordance with the formula:

$$L_{Spacing} = \frac{1}{N_{Sets}} \cdot \frac{L_{MagElements}}{N_{Coils} - 1};$$

where $L_{spacing}$ is the spacing between magnetic elements, $L_{MagElements}$ is the axial length of the magnetic elements, $N_{Coils}$ is the number of coils and $N_{Sets}$ is the number of simultaneously energized coils.

* * * * *